(12) United States Patent
Hirota

(10) Patent No.: US 10,585,511 B2
(45) Date of Patent: Mar. 10, 2020

(54) DISPLAY DEVICE

(71) Applicant: Japan Display Inc., Minato-ku (JP)

(72) Inventor: Takenori Hirota, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/895,081

(22) Filed: Feb. 13, 2018

(65) Prior Publication Data

US 2018/0260061 A1 Sep. 13, 2018

(30) Foreign Application Priority Data

Mar. 8, 2017 (JP) .................................. 2017-043703

(51) Int. Cl.
*G06F 3/045* (2006.01)
*G06F 3/044* (2006.01)
(Continued)

(52) U.S. Cl.
CPC ........ *G06F 3/0412* (2013.01); *G02F 1/13338* (2013.01); *G02F 1/13439* (2013.01); *G02F 1/133345* (2013.01); *G02F 1/133512* (2013.01); *G02F 1/133514* (2013.01); *G02F 1/134309* (2013.01); *G02F 1/136286* (2013.01); *G06F 3/044* (2013.01); *G06F 3/0416* (2013.01); *G09G 3/00* (2013.01); *G09G 3/3648* (2013.01); *G02F 1/1339* (2013.01); *G02F 1/1368* (2013.01); *G02F 1/13452* (2013.01); *G02F 2001/13629* (2013.01); *G02F 2001/134372* (2013.01); *G02F 2201/121* (2013.01); *G02F 2201/123* (2013.01); *G02F 2202/02* (2013.01); *G06F 2203/04107* (2013.01); *G09G 2354/00* (2013.01)

(58) Field of Classification Search
CPC ...... G06F 3/044; G06F 3/0412; G06F 3/0416; G02F 1/13338; G02F 1/13439; G02F 1/133345; G02F 1/136286; G02F 1/133514; G02F 1/133512; G02F 1/134309; G02F 1/13452; G02F 1/1368; G02F 1/1339; G09G 3/00; G09G 3/3648
USPC ....................................... 345/173; 178/18.06
See application file for complete search history.

(56) References Cited

U.S. PATENT DOCUMENTS

| 6,392,735 B1 | 5/2002 | Tani |
| 2010/0110023 A1* | 5/2010 | Chien ..................... G06F 3/044 345/173 |

(Continued)

FOREIGN PATENT DOCUMENTS

| JP | 2001-100217 | 4/2001 |
| WO | WO 2015/125864 A1 | 8/2015 |

*Primary Examiner* — Adam J Snyder
(74) *Attorney, Agent, or Firm* — Oblon, McClelland, Maier & Neustadt, L.L.P.

(57) ABSTRACT

A display device includes: a substrate (first substrate); a substrate (second substrate); a pixel electrode on the first substrate; a common electrode on the first substrate; a signal line existing on the first substrate and extending in a Y direction (first direction); a drive electrode (first electrode) existing on the second substrate and extending in the Y direction; a detection electrode (second electrode) existing on the second substrate and over the drive electrode, extending in an X direction (second direction) intersecting with the Y direction, and electrically connected to a detection circuit. Additionally, the drive electrode intersects with the detection electrode and overlaps the signal line.

12 Claims, 13 Drawing Sheets

(51) Int. Cl.
  *G06F 3/041* (2006.01)
  *G02F 1/1343* (2006.01)
  *G02F 1/1335* (2006.01)
  *G02F 1/1362* (2006.01)
  *G02F 1/1333* (2006.01)
  *G09G 3/36* (2006.01)
  *G09G 3/00* (2006.01)
  G02F 1/1339 (2006.01)
  G02F 1/1368 (2006.01)
  G02F 1/1345 (2006.01)

(56) References Cited

U.S. PATENT DOCUMENTS

| | | | | |
|---|---|---|---|---|
| 2011/0099805 A1* | 5/2011 | Lee | ............ | G06F 3/044 29/846 |
| 2012/0073866 A1* | 3/2012 | Hirai | ............ | G06F 3/044 174/257 |
| 2013/0135540 A1* | 5/2013 | Nam | ............ | G06F 3/044 349/12 |
| 2013/0341651 A1* | 12/2013 | Kim | ............ | G06F 3/044 257/84 |
| 2014/0078104 A1* | 3/2014 | Lee | ............ | G06F 3/044 345/174 |
| 2014/0110236 A1* | 4/2014 | Lee | ............ | G06F 3/044 200/5 A |
| 2014/0176490 A1* | 6/2014 | Zhou | ............ | G06F 3/044 345/174 |
| 2015/0160767 A1* | 6/2015 | Song | ............ | G06F 3/044 345/174 |
| 2015/0185942 A1* | 7/2015 | Kim | ............ | G06F 3/044 345/173 |
| 2017/0045988 A1* | 2/2017 | Sugita | ............ | G06F 3/044 |

* cited by examiner

DISPLAY DEVICE

CROSS-REFERENCE TO RELATED APPLICATION

The present application claims priority from Japanese Patent Application No. 2017-43703 filed on Mar. 8, 2017, the content of which is hereby incorporated by reference into this application.

TECHNICAL FIELD OF THE INVENTION

The present invention relates to a display device, for example, an effective technique applied to a display device in which an input unit such as a touch panel is built.

BACKGROUND OF THE INVENTION

There is, in recent years, a technique of installing a touch panel or an input device called a touch sensor on a display surface side of a display device, and detecting and outputting an input position when an input operation is performed by causing an input instrument such as a finger(s) or a touch pen (also called a stylus pen) to approach or contact the touch panel. The display device having such a touch panel is widely used in a portable information terminal such as a cellular phone and the like besides a computer. For example, Patent Document 1 (International Publication No. 2015/125864) discloses a display device in which a touch panel with an electrostatic capacity method is built. Additionally, Patent Document 2 (Japanese Patent Application Laid-open No. 2001-100217) discloses a structure of conducting respective wirings in a pair of substrates bonded together by a seal.

SUMMARY OF THE INVENTION

An electrostatic capacity method is present as one of detection methods of detecting positions which an input instrument has contacted. An input unit (input device) using the electrostatic capacity method includes, for example, the following structure. That is, a plurality of capacitative elements connected to a detection substrate are provided in a detection surface of the input unit. When an input operation is performed by causing a finger(s) or/and an input instrument such as a touch pen to approach or contact the capacitative elements, capacitance in the capacitative elements varies and such variation is used to detect an input position(s). Hereinafter, the specification in the present application is often described by abbreviating, as a "touch" or "touch operation", the input operation of causing the input instrument to approach or contact the detection surface in the input unit. Additionally, the specification is often described by abbreviating, as "touch detection", detection of a touch(s) with the input instrument by the input unit.

A display device with an input unit includes a pixel electrode(s) and a common electrode(s) for driving an electrooptical layer(s) when displaying an image(s). The display device with the input unit includes a touch detection electrode(s) for detecting a touch position(s) on a coordinate plane when making touch detection. In view of thinning of the entire display device in size, the touch detection electrode and the electrodes for driving the electrooptical layer are preferably arranged at positions close to one another. Meanwhile, if the touch detection electrode is arranged close to the electrooptical layer, an influence on the electrooptical layer by the touch detection electrode needs to be reduced when the image is displayed.

An object of the present invention is to provide a technique for improving performance of a display device.

A display device according to the present invention includes: a first substrate; a second substrate; a pixel electrode on the first substrate; a common electrode on the first substrate; a first signal line existing on the first substrate and extending in a first direction; a first electrode existing on the second substrate and extending in the first direction; and a second electrode existing over the first electrode, extending in a second direction intersecting with the first direction, and electrically connected to a detection circuit. Additionally, the first electrode intersects with the second electrode, and overlaps the first signal line.

BRIEF DESCRIPTIONS OF THE DRAWINGS

DESCRIPTIONS OF THE PREFERRED EMBODIMENTS

Figure 1:
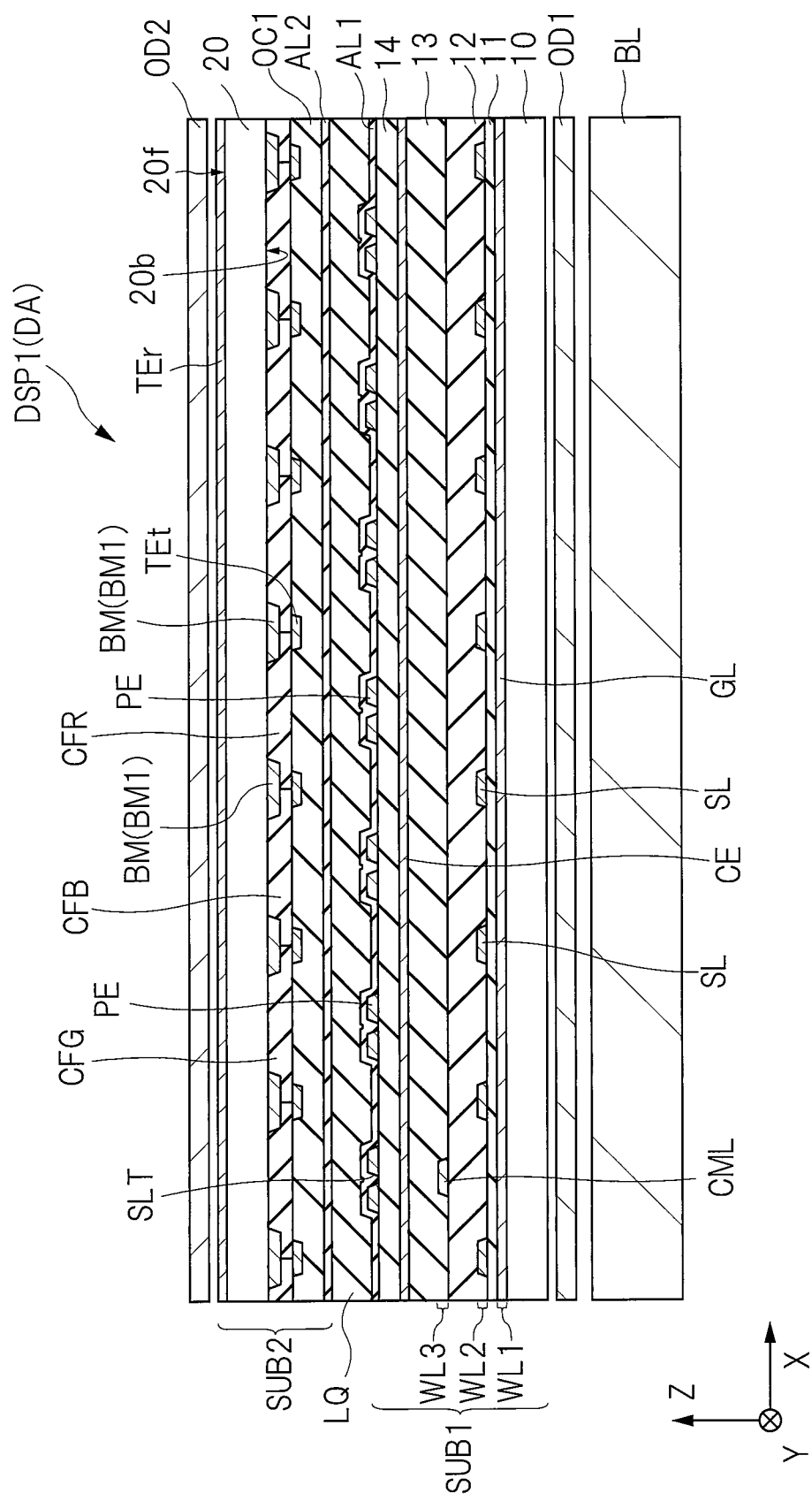
FIG. 1 is an enlarged sectional view showing a configuration example of a part of a display region in a display device according to an embodiment.

Hereinafter, embodiments of the present invention will be described in detail with reference to the drawings. Note that the disclosure is mere an example, and it is a matter of course that any alteration that is easily made by a person skilled in the art while keeping a gist of the present invention is included in the present invention. In addition, the drawings schematically illustrate a width, a thickness, a shape and the like of each portion as compared to actual aspects in order to make the description clearer, but the drawings are mere examples and do not limit the interpretation of the present invention. In addition, the same reference characters are applied to the same elements as those described in relation to the foregoing drawings in the present specification and the respective drawings, and detailed descriptions thereof will be appropriately omitted in some cases.

Additionally, an input unit or input device in the present application means a unit or device that detects, as a signal, a command(s) inputted from outside. The specification in the present application will be described about an electrostatic capacity type input unit in which an input is detected as a signal(s) by using an electrostatic capacitance varying depending on a capacity of an object approaching or contacting an electrode(s).

Additionally, a touch panel is one aspect of an input unit (input device), and is an input unit for detecting an input signal(s) and calculating and outputting a touch position when an input operation is performed by causing a finger(s), an input instrument such as a touch pen, or the like to be close to (approach or contact) the touch panel. The touch position is given by positional coordinates on a coordinate plane for detecting an input signal(s).

Like the touch panel, the input unit (input device) calculating the touch position is often utilized in combination with a display unit (display device) for displaying an image(s). Called an external type or an on-cell type display device is an input function equipped display device to be utilized in a state of overlapping the display unit and the input unit, the display unit and the input unit being each assembled by different parts independent from each other. Additionally, called a built-in type or an in-cell type display device is an input function equipped display device to be utilized in a state in which part or all of components configuring an input detection unit for detecting an input signal(s) is assembled between components configuring the display unit for displaying an image(s). The in-cell type display device includes a display device in which part or all of components configuring the input unit shares with part or all of the components configuring the display unit. The in-cell type display device also includes a display device in which the components configuring the input unit do not share mutually with the components configuring the display unit.

Additionally, the following embodiment will be described by taking up a liquid crystal display device as a typical example of the display device. The liquid crystal display device is divided by the following two major classifications depending on a direction of applying an electric field for changing orientations of liquid crystal molecules in a liquid crystal layer that is an electrooptical layer. That is, there is, as a first classification, a so-called vertical electric field mode in which the electric field is applied in a thickness direction (or an out-of-plane direction) of the display device. The vertical electric field mode includes, for example, a twisted nematic (TN) mode and a vertical alignment (VA) mode, etc. Additionally, there is, as a second classification, a so-called horizontal electric field mode in which the electric field is applied in a plane direction (or an in-plane direction) of the display device. The horizontal electric field mode includes, for example, an in-plane switching (IPS) mode, a fringe field switching (FFS) mode belonging to one kind of IPS mode, and the like. The following embodiment will be described by taking up, as an example, a display device driven by the horizontal electric field mode.

<Configuration of Display Device>

Figure 2:
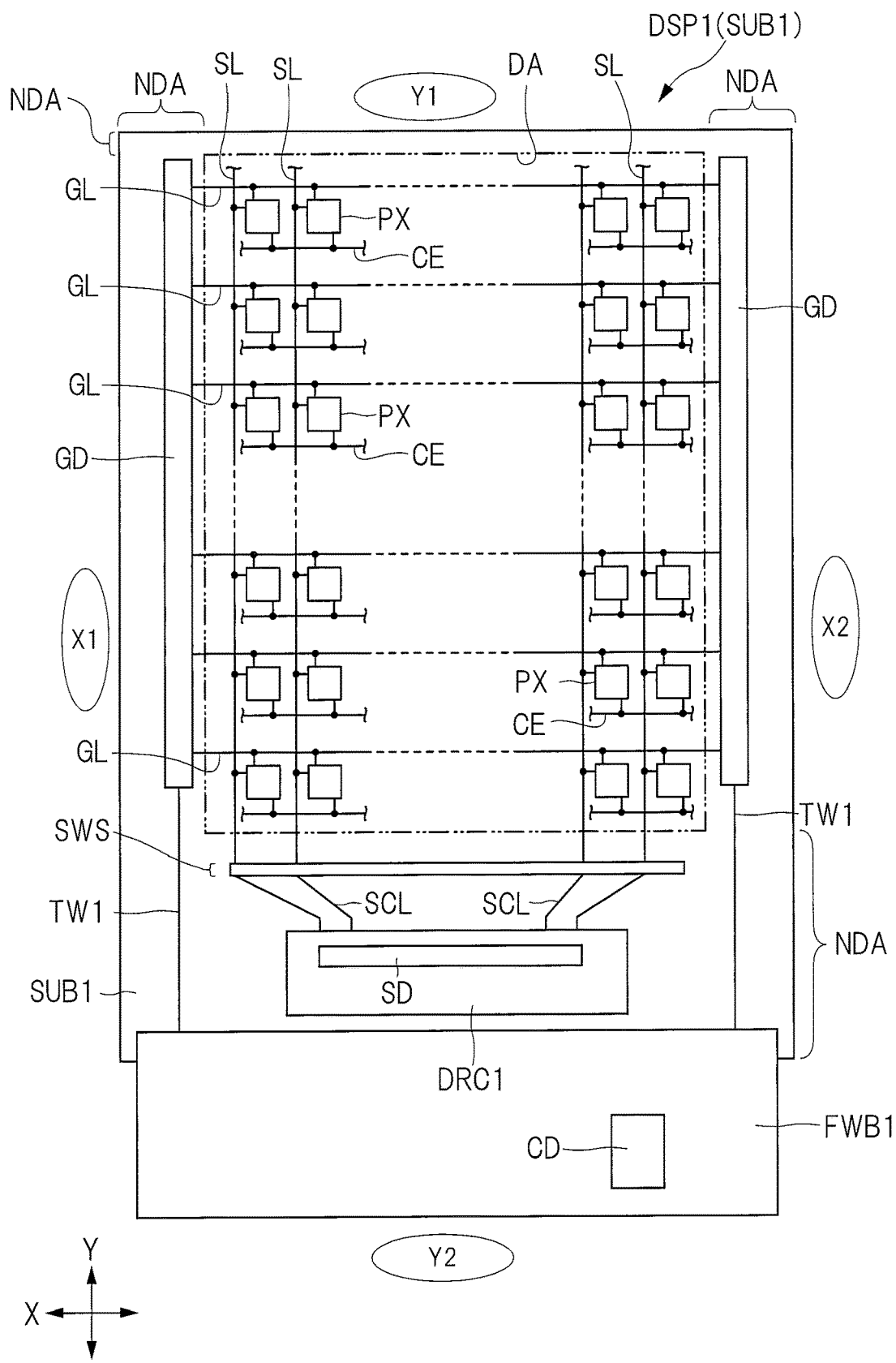
FIG. 2 is a plan view showing a configuration example of components provided on an array substrate side in the display device illustrated in FIG. 1.
Figure 3:
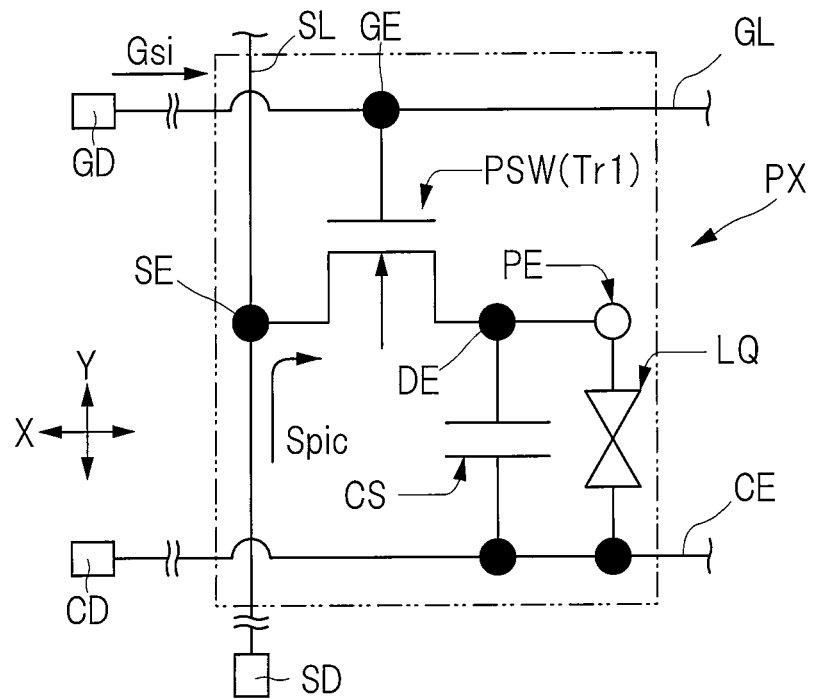
FIG. 3 is a circuit diagram showing a circuit configuration example on a periphery of one image in the display device illustrated in FIG. 2.
Figure 4:
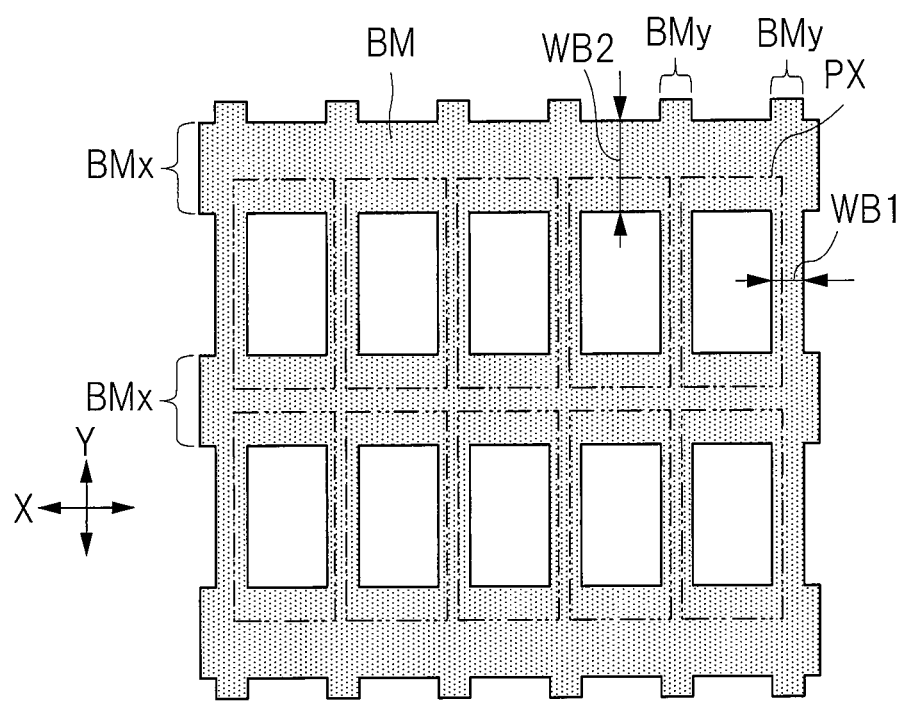
FIG. 4 is an enlarged plan view showing a plane-shaped example of a light shielding film provided on a display region in the display device illustrated in FIG. 1.
Figure 5:
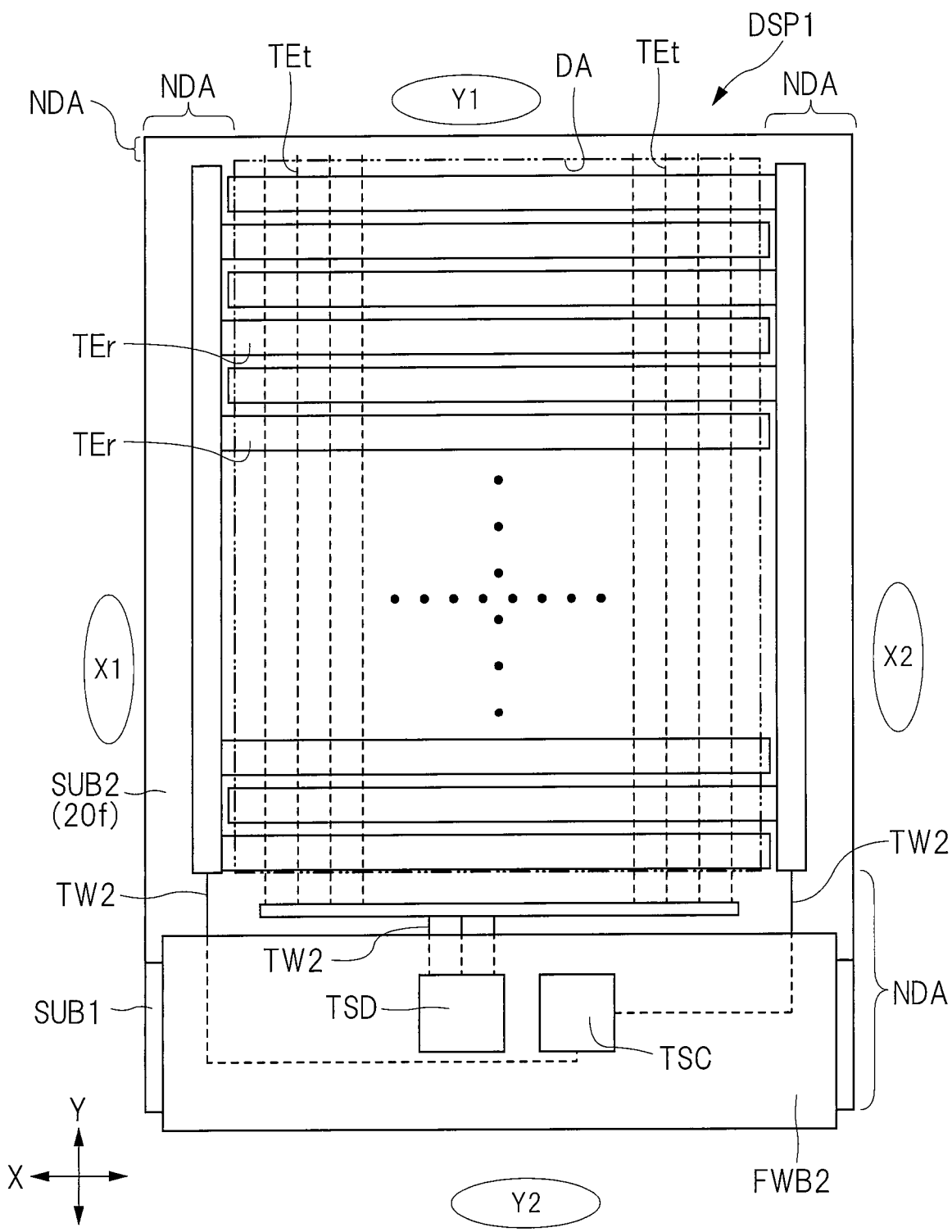
FIG. 5 is a plan view showing a configuration example of components provided on an opposite electrode side in the display device illustrated in FIG. 1.

FIG. 1 is an enlarged sectional view showing a configuration example of a part of a display region in a display device according to an embodiment. In order to show an example of a position relation between a scanning line GL and a signal line SL in a thickness direction (a Z direction in FIG. 1) of a substrate SUB1, another scanning line GL provided on a section different from that in FIG. 1 is shown together in FIG. 1. Additionally, FIG. 1 is a sectional view, but hatchings of substrates 10 and 20 are omitted. Each of sectional views to be described below shows the substrates 10 and 20 with their hatchings omitted. FIG. 2 is a plan view showing a configuration example of components provided on an array substrate side in the display device illustrated in FIG. 1. FIG. 3 is a circuit diagram showing a circuit configuration example on a periphery of one image in the display device illustrated in FIG. 2. FIG. 4 is an enlarged plan view showing a plane-shaped example of a light shielding film provided on a display region in the display device illustrated in FIG. 1. FIG. 5 is a plan view showing a configuration example of components provided on an opposite electrode side in the display device illustrated in FIG. 1. FIGS. 2 and 5 each show an outline of a display region DA by a dash-double-dot line in order to differentiate a boundary between the display region DA and a frame region (peripheral region or non-display region) NDA in a plan view.

As shown in FIG. 1, a display device DSP1 has: a substrate SUB1; a substrate SUB2 arranged opposite the substrate SUB1; and a liquid crystal layer LQ arranged between the substrates SUB1 and SUB2. The substrate SUB1 is an array substrate in which a plurality of transistors as switching elements are arranged in an array shape. The substrate SUB2 can be reworded as an opposite electrode in terms of a meaning of a substrate arranged opposite the array substrate. The liquid crystal layer LQ is the above-described electrooptical layer and has a function of controlling a state of an electric field generated around the liquid crystal layer LQ to modulate light passing it.

Additionally, as shown in FIGS. 2 and 5, the display device DSP1 in the present embodiment has a display region DA where images are formed depending on input signals supplied from outside. The display device DSP1 also has, in a plan view, a frame region NDA that is a non-display region provided in a frame shape in a circumference of the display region DA. Incidentally, in an example shown in FIGS. 2 and 5, the display region DA is quadrangular, but the display region DA may have a shape other than a quadrangle.

As shown in FIG. 1, the substrate SUB1 is equipped with a substrate (base substrate or insulating substrate) 10. Additionally, the substrate SUB2 is equipped with a substrate (base substrate or insulating substrate) 20. Each of the substrates 10 and 20 is made of, for example, glass or a transparent resin material and has a characteristic of being transmitted by visible light. The substrates SUB1 and SUB2 (the substrates 10 and 20 if reworded) are laminated in a state separate from each other. The substrates SUB1 and SUB2 are bonded via a bonding layer (a sealing material SL1 shown in FIG. 14 described below) arranged in the frame region NDA (see FIG. 2). The liquid crystal layer LQ is sealed between the substrates SUB1 and SUB2.

Additionally, the substrate SUB1 has a plurality of conductive patterns arranged between the substrates 10 and 20. The plural conductive patterns include a plurality of scanning lines (gate lines) GL, a plurality of signal lines (source lines) SL, a common line CML, a common electrode CE, and a plurality of pixel electrodes PE. An insulating film is interposed between every two of the plural conductive patterns. The insulating film, which is arranged between the adjacent conductive patterns and by which the conductive patterns are insulated from each other, includes insulating films 11, 12, 13, and 14, and an orientation film AL1. Incidentally, FIG. 1 shows that each of the scanning line GL, common electrode CE, and common line CML is one in number.

Each of the plural conductive patterns described above is formed on a plurality of wiring layers stacked. In the example shown in FIG. 1, the common electrode CE and pixel electrode PE are respectively formed on different layers, three layers of the wiring layers WL1, WL2, and WL3 are provided in this order from a substrate 10 side and under a layer on which the common electrode CE is formed.

The scanning line GL is mainly formed on the first wiring layer WL1 that is provided closest to the substrate 10 side among the three wiring layers formed on the substrate 10. The conductive pattern formed on the wiring layer WL1 contains, for example, metal such as chromium (Cr), titanium (Ti), or molybdenum (Mo), or their ally. The insulating film 11 is also an insulating film provided on the substrate 10 side and covering the conductive pattern(s) formed on the wiring layer WL1. The insulating film 11 is a transparent inorganic insulating film made of, for example, silicon nitride, silicon oxide, or the like.

As shown in FIG. 2, each of the plural scanning lines GL extends in an X direction. Additionally, the plural scanning lines GL are almost evenly spaced from each other and are arranged in a Y direction. In other words, the plural scanning lines GL are arranged from an Y1 side toward an Y2 side, the Y1 side being one side of the Y direction and the Y2 side being the other side thereof. Each of the plural scanning lines GL is drawn into the frame region NDA existing outside the display region DA, and is connected to a scanning line drive circuit (gate drive circuit) GD. The scanning line drive circuit GD is a scanning signal output circuit that outputs a scanning signal(s) Gsi (see FIG. 3) to be inputted into the plural scanning lines GL. The scanning line drive circuit GD is provided on the substrate SUB1 in the frame region NDA.

Additionally, a semiconductor layer etc. of a gate electrode GE a transistor Tr1 serving as a pixel switching element PSW shown in FIG. 3 are formed between the substrate 10 and the insulating film 11 shown in FIG. 1 besides the scanning line GL. The transistor Tr1 is a thin film transistor (TFT). The scanning line GL also includes a gate electrode GE of the transistor Tr1 serving as the pixel switching element PSW.

As shown in FIG. 1, the second wiring layer WL2 is formed on the insulating film 11. The signal line SL is mainly formed on the wiring layer WL2. Each of the conductive patterns formed on the wiring layer WL2 is made of a metal film having a multi-layer structure, for example, in which aluminum (Al) is sandwiched between molybdenum (Mo) and titanium (Ti), etc. The source electrode SE and drain electrode DE etc. of the pixel switching element PSW shown in FIG. 3 are also formed on the insulating film 11. The insulating film 12 is formed on each of the signal line SL and the insulating film 11. The insulating films 12, 13, and 14 are organic insulating films each containing, for example, an acrylic photosensitive resin etc.

As shown in FIG. 2, each of the plural signal lines (image signal lines) SL extends in the Y direction. Additionally, the plural signal lines are almost evenly spaced from each other and are arranged in the X direction. In other words, the plural signal lines SL are arranged from an X1 side toward an X2 side, the X1 side being one side of the X direction and the X2 side being the other side thereof. Each of the plural signal lines SL is drawn into the frame region NDA existing outside the display region DA. Each of the plural signal lines SL is electrically connected to a driver chip DRC1 via a signal connection wiring SCL serving as a connection wiring (also called draw wiring) that connects the signal line SL and the driver chip DRC1 in the display region DA to each other. The driver chip DRC1 has a signal line drive circuit SD that drives the liquid crystal layer LQ (see FIG. 1) via the signal line SL. The signal line drive circuit SD supplies, via the signal line SL, an image signal Spic (see FIG. 3) to a pixel electrode PE (see FIG. 3) that each of a plurality of sub-pixels PX has.

called a signal line SL is a portion (wiring portion) connected to the driver chip DRC1, the portion being on an image signal line serving as a signal transmission path for supplying the image signal to the plural sub-pixels PX and being located at an overlapping position with the display region DA. Additionally, called a signal connection wiring SCL is a portion (wiring portion) existing outside the display region DA and on the above-described image signal line. Each of the plural signal lines SL extends in the Y direction. Meanwhile, the signal connection wiring SCL is a wiring for connecting the signal line SL and the driver chip DRC1. For this reason, as shown in FIG. 2, the plural signal connection wirings radiate from a terminal group (not shown) connected to the driver chip DRC1 toward the display region DA. Incidentally, the driver chip DRC1 is not essential, and a function of the driver chip DRC1 may be included in a flexible wiring board FWB1 described later.

Additionally, in an example shown in FIG. 2, a switch circuit unit SWS is between the signal line SL and the signal connection wiring SCL. The switch circuit unit SWS is, for example, a multiplexer circuit, and selects each color signal line SL to output the inputted signal. The switch circuit unit SWS operates as a section switch for selecting a kind of an image signal such as a red, green, or blue signal. In this case, the number of signal connection wirings SCL, which connect the switch circuit unit SWS and the driver chip DRC1, may be fewer than that of the signal lines SL. Thus, if the number of signal connection wirings SCL can be reduced by providing the switch circuit unit SWS, the number of signal connection wirings SCL can be reduced between the driver chip DRC1 and the switch circuit unit SWS.

As shown in FIG. 1, the third wiring layer WL3 is formed on the insulating film 12. A common line CML is mainly formed on the wiring layer WL3. Similarly to the wiring layer WL2, the conductive patterns formed on the wiring layer WL3 are each made of a metal film having a multi-layer structure, for example, in which aluminum (AL) is sandwiched between molybdenum (Mo) and titanium (Ti), etc. In the example shown in FIG. 1, the common line CML extends in the Y direction, and the insulating film 13 is formed on each of the common line CML and the insulating film 12.

The common electrode CE is formed on the insulating film 13. The common electrode CE is supplied with a drive potential common to the plural sub-pixels PX (see FIG. 2) in a display period in which the display device DSP1 displays an image(s). For this reason, the common electrode CE is arranged in the entire display region DA. There is various aspects about the number of common electrodes CE. For example, a single common electrode CE may be in the display region DA, or a plurality of common electrodes CE may be on the display region DA. The common electrode CE is preferably formed of a transparent conductive material such as indium tin oxide (ITO) or indium zinc oxide (IZO).

In the sectional view shown in FIG. 1, the insulating film 13 is interposed between the common electrode CE and the common line CML. However, part of the common line CML and part of the common electrode CE are electrically connected to each other. The common electrode CE is electrically connected to a common electrode drive circuit CD (see FIG. 3) via the common line CML. The common electrode drive circuit CD is a circuit for supplying a common potential to the common electrode CE in the display period. In the example shown in FIG. 2, the common electrode drive circuit CD is formed on a wiring board (flexible wiring board) FWB1 connected to the substrate SUB1.

Additionally, the insulating film 14 is formed on the insulating film 13 and the common electrode CE. The pixel electrodes PE are formed on the insulating film 14. Each of the pixel electrodes PE is located between the two signal lines SL adjacent to each other in a plan view. In the example shown in FIG. 1, each of the plural pixel electrodes PE is arranged at a position opposite to the common electrode CE. In the example shown in FIG. 1, each of the plural pixel electrodes PE is composed of a plurality of portions adjacent to each other via a slit SLT. When the pixel electrode PE and the common electrode CE are formed on different layers like the present embodiment, some in a plurality of electric lines of force pass through the slit SLT by the presence of the slit SLT. This improves strength of an electric field generated around the liquid crystal layer LQ, which makes it easy to drive liquid crystal molecules.

However, as long as the electric field is generated for driving the liquid crystal molecules in supplying the potential to the pixel electrode PE and the common electrode CE, the pixel electrode PE may not oppose the common electrode CE. For example, as a modification example with respect to the present embodiment, the plural common electrodes CE and the plural pixel electrodes PE may be formed on the same surface (e.g., on the insulating film 13) and be alternately arranged so as to be adjacent to each other. The pixel electrode PE is preferably composed of a transparent conductive material or metal material made of, for example, ITO, IZO, or the like. The orientation film AL1 covers the pixel electrode PE and the insulating film 14. The orientation films AL1 and AL2 are organic insulating films formed for aligning initial orientations of liquid crystal molecules contained in the liquid crystal layer LQ, and includes, for example, a polyimide resin.

As shown in FIG. 3, each of the plural sub-pixels PX shown in FIG. 2 has a pixel switching element PSW and a pixel electrode PE. A source electrode SE of the transistor Tr1 that is a pixel switching element PSW is connected to the signal line SL, and a drain electrode DE thereof is connected to the pixel electrode PE. The scanning line drive circuit GD supplies a scanning signal Gsi to the gate electrode GE in the display period, and causes the pixel switching element PSW to ON/OFF-operate, thereby controlling a supplying state of the image signal Spic to the pixel electrode PE. In other words, the transistor Tr1 functions as the pixel switching element PSW for controlling a supply of a potential to the pixel electrode PE. The pixel switching element PSW may be any of a top gate type TFT and a bottom gate type TFT. Additionally, a semiconductor layer of the pixel switching element PSW is made of, for example, polycrystalline silicon (polysilicon), but may be made of amorphous silicon.

Additionally, as shown in FIG. 1, the insulating film 14 functioning as a dielectric is interposed between the pixel electrode PE and the common electrode CE. The common electrode CE, insulating film 14, and pixel electrode PE form a retention capacity shown in FIG. 3. An electric field is generated between the pixel electrode PE and the common electrode CE on the basis of a drive signal applied to each of their electrodes in a display operation period (a display period FLD shown in FIG. 6 described below) for forming a display image(s) based on the image signal(s). The liquid crystal molecules constituting the liquid crystal layer LQ that is the electrooptical layer are driven by the electric field generated between the pixel electrode PE and the common electrode CE. In the display device DSP1 utilizing the horizontal electric field mode like the present embodiment, for example, the substrate SUB1 is provided with the pixel electrode PE and the common electrode CE as shown in FIG. 1. The liquid crystal molecules constituting the liquid crystal layer LQ are rotated by utilizing the electric field (e.g., an electric field almost parallel to a main surface of the substrate out of a fringe electric field) generated between the pixel electrode PE and the common electrode CE. That is, each of the pixel electrode PE and the common electrode CE in the display period operates as a drive electrode for driving the liquid crystal layer LQ that is the electrooptical layer.

Additionally, as shown in FIG. 1, the substrate SUB2 has: light shielding films BM; color filters CFR, CFG, and CFB; drive electrodes TEt; an insulating film OC1; and an orientation film AL2, the light shielding films and color filters existing on a surface (back surface) 20b side of the substrate 20 opposing the substrate SUB1. The substrate SUB2 also has a detection electrode TEr existing on a side of a surface (front surface) 20f opposite to the surface 20b of the substrate 20 opposing the substrate SUB1.

The color filters CFR, CFG, and CFB are formed on a side of the surface 20b opposing the substrate SUB1 out of the two surfaces 20f and 20b of the substrate 20, the surfaces 20f and 20b being located opposite each other. In the example shown in FIG. 1, the threes color filters CFR, CFG, and CFB of red (R), green (g), and blue (B) colors are arranged periodically. A color display device configures one pixel (also called one picture element) as a set of, for example, three color sub-pixels of those red (R), green (G), and blue (B) colors. The plurality of color filters CFR, CFG, and CFB on the substrate SUB2 are arranged at positions mutually opposing the sub-pixels each having the pixel electrode PE formed on the substrate SUB1.

Additionally, the light shielding film BM is arranged on a boundary between each of the color filters CFR, CFG, and CFB. The light shielding film BM is called a black matrix and contains, for example, a black resin or low reflective metal. The light shielding film BM is formed, for example, in a lattice shape as shown in FIG. 4 in a plan view. In other words, the light shielding film BM extends in the X and Y directions. More specifically, the light shielding film BM has a plurality of portions BMy each extending in the Y direction and a plurality of portions BMx each extending in the X direction intersecting with the Y direction. Since each of the sub-pixels PX is partitioned by the black matrix, leakage of light or/and color mixture can be suppressed.

Incidentally, elements configuring one pixel are not limited to the three colors of red (R), green (G), and blue (B). The shape of the light shielding film BM is not limited to the lattice shape, and may be a stripe shape. Additionally, although omitted in the drawings, the light shielding film BM is formed in the entirety of the frame region DA of the substrate SUB2 shown in FIG. 4.

In this specification, a region indicated by the display region DA is defined as an inside region of the frame region NDA. Additionally, the frame region NDA is a region overlapping with the light shielding film BM that blocks light emitted from a backlight unit (light source) BL shown in FIG. 1. The light shielding film BM is formed also in the display region DA, but a plurality of openings are formed in the light shielding film BM in the display region DA. An end of the opening, which is formed closest to a periphery side, among the openings formed in the light shielding film BM and exposing the color filters therefrom is generally defined as a boundary between the display region DA and the frame region NDA.

Additionally, an insulating film OC1 shown in FIG. 1 covers the color filters CFR, CFG, and CFB and the plural drive electrodes TEt. The insulating film OC1 functions as a protective film that prevents impurities from diffusing from the color filters to the liquid crystal layer. The insulating film OC1 is an organic insulating film containing, for example, an acrylic photosensitive resin etc.

Additionally, the drive electrodes TEt and the detection electrode TEr are electrodes configuring the input unit for performing touch detection. In the example shown in FIG. 1, the drive electrodes TEt are formed between the color filters CFR, CFG, CFB and the orientation film AL2, and are covered with the insulating film OC1. The detection electrode TEr is arranged on the surface 20f side of the substrate 20. For this reason, the drive electrode TEt and the detection electrode TEr oppose each other via the substrate 20 that is a dielectric.

As shown in FIG. 5, each of the plural drive electrodes TEt extends in the Y direction. Additionally, the plural drive electrodes TEt are almost evenly spaced from each other and are arranged in the X direction. The plural detection electrodes TEr extend in the X direction. Additionally, the plural detection electrodes TEr are almost evenly spaced from each other and are arranged in the Y direction. Each of the plural detection electrodes TEr intersects with two or more of the drive electrodes TEt in a plan view. A capacitive element used for detection of the touch position is formed for each of intersections where the plural detection electrodes TEr and the plural drive electrodes TEt intersect with each other. In a case of the display device DSP1 according to the present embodiment, a drive signal is applied to the plural drive electrodes TEt in order in a detection period FLt (see FIG. 6 described later) for performing the touch detection. Thus, a location of the capacitive element, in which a signal is generated depending on capacity variation, among the plural capacitive elements intersecting with the detection electrodes TEr and the drive electrodes TEt is detected, and its touch position is calculated.

Additionally, as shown in FIG. 1, the drive electrode TEt overlaps the signal line SL. The plural drive electrodes TEt overlap the plural signal lines SL. Further, the drive electrode TEt and the signal line SL overlap the light shielding film BM. More specifically, the drive electrode TEt overlaps a Y-direction extending part of the light shielding film BM. In this case, since an optical influence on the drive electrode TEt can be reduced, a degree of freedom of material selection is improved. For example, in the present embodiment, the drive electrode TEt contains a metal material. Since the metal material is used as the drive electrode TEt, an electrical characteristic such as impedance can be improved in comparison with a transparent conductive material such as ITO or IZO.

Additionally, as shown in FIG. 1, the detection electrode TEr has a part overlapping the light shielding film BM, and a part not overlapping the light shielding film BM. In this case, a material having a high transmittance of visible light is preferably used as the detection electrode TEr. In a case of the present embodiment, the detection electrode TEr is made of a transparent conductive material such as ITO or IZO.

Additionally, each of the plural drive electrodes TEt is connected to the detection drive circuit TSD shown in FIG. 5. Each of the plural detection electrodes TEr is connected to the detection circuit TSC shown in FIG. 5. In an example shown in FIG. 5, the detection drive circuit TSD and the detection circuit TSC are connected to the substrate SUB2 and lie on the wiring board (flexible wiring board) FW2. A not-shown IC chip mounted on the wiring board FWB2, and the IC chip may have the detection drive circuit TSD and the detection circuit TSC. Or, as schematically shown in FIG. 5, the detection drive circuit TSD and the detection circuit TSC may be formed directly on the wiring board FWB2.

Additionally, as shown in FIG. 1, the display device DSP1 has an optical element OD1 and an optical element OD2. The optical element OD1 is arranged between the substrate 10 and the backlight unit BL. The optical element OD2 is arranged over the substrate 20, that is, opposite the substrate SUB1 with respect to the substrate 20. Each of the optical elements OD1 and OD2 includes at least a polarization plate, and may include a phase difference plate as the need arises.

<Operation of Display Device>

Figure 6:
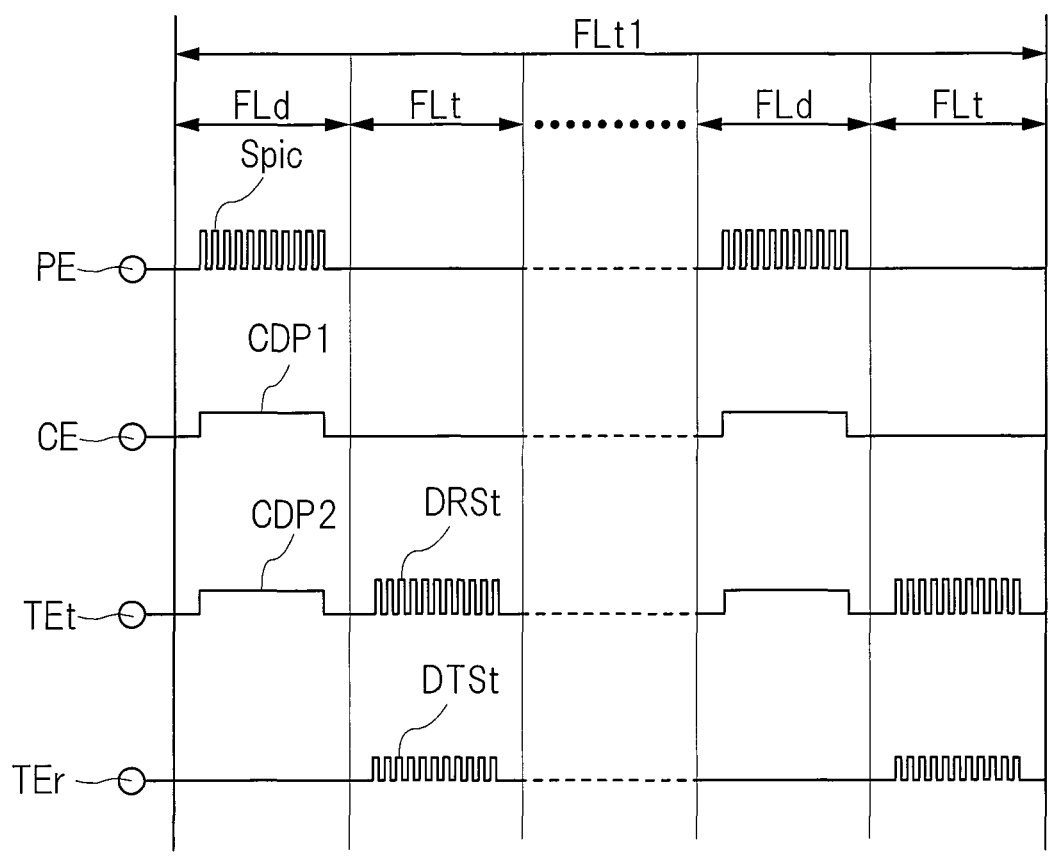
FIG. 6 is a timing chart showing an operation example of the display device illustrated in FIG. 1.
Figure 7:
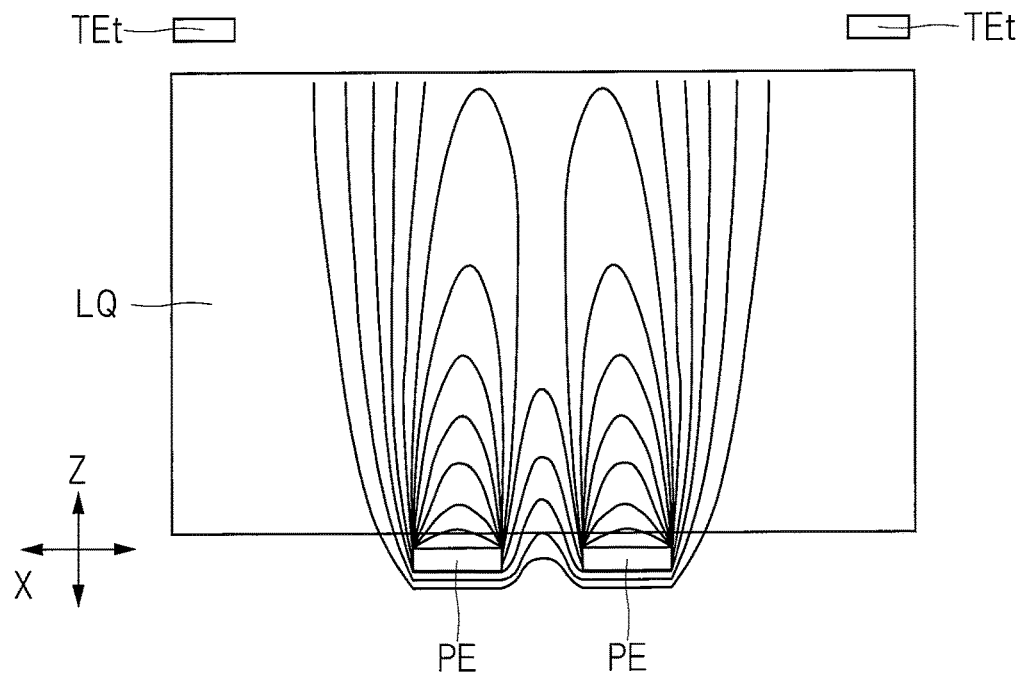
FIG. 7 is a sectional view schematically showing a main part of formation of an electric field generated around a pixel electrode when a potential is supplied to a drive electrode in a display period illustrated in FIG. 6.
Figure 8:
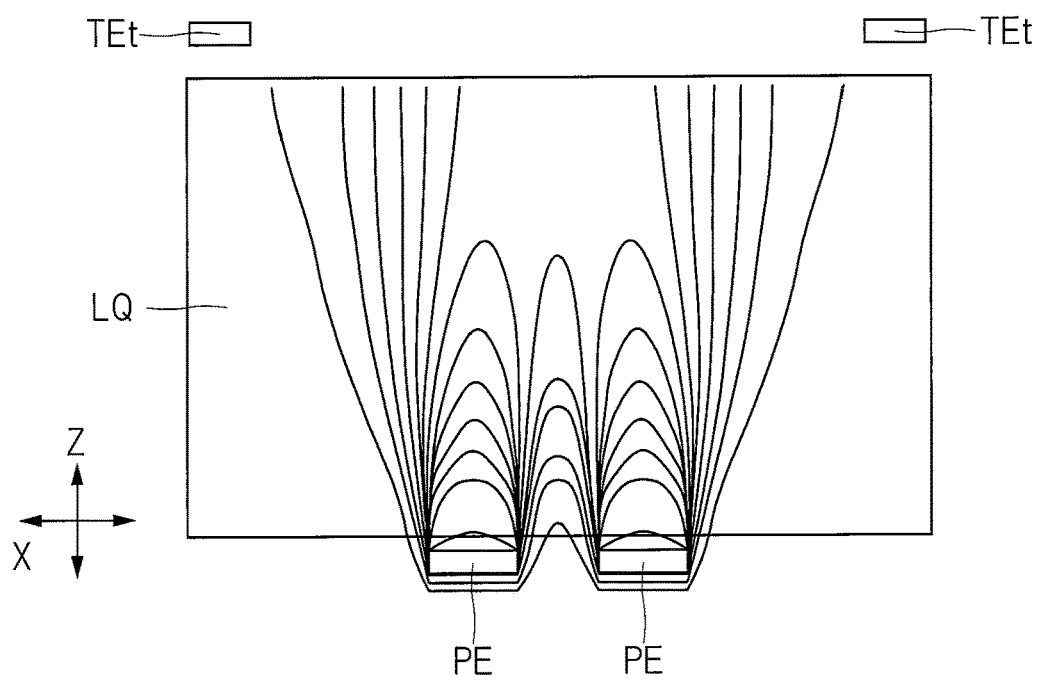
FIG. 8 is a sectional view schematically showing a main part of formation of an electric field generated around the pixel electrode when no potential is supplied to the drive electrode in the display period illustrated in FIG. 6.

Next, an operation of the display device DSP1 will be described. FIG. 6 is a timing chart showing an operation example of the display device illustrated in FIG. 1. FIG. 7 is a sectional view schematically showing a main part of formation of an electric field generated around a pixel electrode when a potential is supplied to a drive electrode in a display period illustrated in FIG. 6. FIG. 8 is a sectional view schematically showing a main part of formation of an electric field generated around the pixel electrode when no potential is supplied to the drive electrode in the display period illustrated in FIG. 6. Incidentally, FIGS. 7 and 8 show, by a plurality of equipotential lines, potential distributions in a periphery of the liquid crystal layer LQ when the transistor Tr1 (see FIG. 3) is turned on.

As shown in FIG. 6, a period (frame period FL1) in which the display device DSP1 (see FIG. 1) according to the present embodiment operates includes a display period FLd for forming a display image(s), and a detection period FLt for detecting an input(s). In an example shown in FIG. 6, one frame period FL1 includes a plurality of display periods FLd and a plurality of detection periods FLt. The display period FLd and the detection period FLt are alternately repeated.

As shown in FIG. 6, supplied to the common electrode CE in the display period FLd is a potential CDP1 that is a drive potential common to the plural sub-pixels PX (see FIG. 2). An image signal(s) Spic is also supplied to the pixel electrode PE via the signal line SL (see FIG. 3) in the display period FLd. An electric field is generated between the common electrode CE and the pixel electrode PE in the sub-pixel PX in which the scanning signal Gsi is inputted into the transistor Tr1 shown in FIG. 3 and whose switch is turned on. By this electric field, the liquid crystal molecules configuring the liquid crystal layer LQ (see FIG. 1) are driven. The driving of the liquid crystal molecules brings variances of the transmittance of visible light to the liquid crystal layer LQ.

Additionally, a touch detection drive signal(s) DRSt is supplied to the drive electrode TEt in the detection period FLt. A detection signal DTSt is outputted from the detection electrode TEr. A value of the detection signal DTSt varies in a periphery of the intersection, which a not-shown conductor (a finger(s), a metal pen, or the like) approaches, among the plural intersections mutually intersecting with the plural drive electrodes TEt and the plural detection electrodes TEr shown in FIG. 5 in comparison with that of the intersection that no conductor approaches. For this reason, the touch position can be specified by detecting the variation of the values of the detection signal DTSt. An arithmetic processing for calculating the touch position based on the variation of the values of the detection signal DTSt can be performed by, for example, the detection circuit TSC shown in FIG. 5.

Additionally, in the example shown in FIG. 6, a potential (signal or high-side potential) is not supplied to the pixel electrode PE and the common electrode CE in the detection period FLt. A potential (signal or high-side potential) is not supplied to the detection electrode TEr in the displace period FLd.

Incidentally, FIG. 6 shows, as a rectangular wave, an example of a signal waveform to be supplied to each of the electrodes. The lowest position in each of the signal waveforms shows that a potential level is a ground state. When the potential level is the ground state, the ground state includes a state of supplying no potential to each of the electrodes. Additionally, when the potential level is the ground state, the ground state includes a state in which a reference potential (low-side potential) such as a grounding potential is supplied to each of the electrodes. When the reference potential is supplied to the each of the electrodes in the ground state, each of the image signal Spic, potentials CDP1 and CDP2, drive signal DRSt, and detection signal DTSt can discriminate a high-side potential and a low-side potential, a potential level higher than that of the ground state being called the high-side potential, the reference potential being called the low-side potential. In this case, the phrases "the potential being supplied" and "no potential being supplied" as described above can be reworded to the phrase "the high-side potential being supplied" and "no high-side potential being supplied". When the phrases "the potential being supplied" and "no potential being supplied" are used also in the following description of the present specification, they are used as almost the same meanings that are mentioned above.

Additionally, in the example shown in FIG. 6, supplied to the drive electrode TEt in the display period FLd is a potential CDP2 different from the drive signal DRSt. The potential CDP2 has, for example, the same potential as the potential CDP1 to be supplied to the common electrode CE in the display period FLd. In other words, the same potential is supplied to each of the drive electrode TEt and the common electrode CE in the display period FLd. If a signal (potential) is supplied to the common electrode CE and the pixel electrode PE in the display period FLd, an electric field is generated for driving the liquid crystal molecules.

For example, similarly to the waveform of the detection electrode TEr in the display period FLd, even when no potential is supplied to the drive electrode TEt serving as a touch detection electrode in the display period FLd, an electric field is generated around the liquid crystal layer LQ. In FIG. 8 showing a modification example with respect to an example shown in FIG. 7, the drive electrode TEt electrically becomes floating, and equipotential lines to be formed in the periphery of the liquid crystal layer LQ are shown in the state in which no potential is supplied.

Like the present embodiment, the liquid crystal molecules each having a type of being driven by the horizontal electric field mode are driven by a horizontally extending component, i.e., a X-direction extending component (more specifically, a component extending along a X-Y plan) in the electric field generated around the liquid crystal layer LQ. When a potential distribution is shown by equipotential lines as shown in FIGS. 7 and 8, strength of the electric field become greater as a clearance distance between the adjacent equipotential lines is shorter. For example, in a case of an example shown in FIG. 8, the plural equipotential lines are formed in high density in a lower region of FIG. 8, i.e., at position closer to the pixel electrode PE than to the drive electrode TEt. Meanwhile, the clearance distance between the adjacent equipotential lines becomes larger in an upper region of FIG. 8, i.e., in a region close to the drive electrode Ret than in the lower region thereof. In a case of the potential distribution shown in FIG. 8, the strength of the electric field is greater in the vicinity of the pixel electrode PE than in the vicinity of the drive electrode TEt. For this reason, the liquid crystal molecules, which are arranged on the pixel electrode PE side in the Z direction, among the liquid crystal molecules dependent on the liquid crystal layer LQ are driven particularly well.

Additionally, in the case of the present embodiment, the potential CDP2 is supplied to the drive electrode TEt in the display period FLd as shown in FIG. 6. In this case, shapes of the equipotential lines are affected by a potential to be supplied to the drive electrode TEt. For example, when the potential CDP2 has a rectangular waveform of the same potential as the potential CDP1, the electric field shown in FIG. 7 is generated. The followings are understood by the comparison of FIGS. 7 and 8: when the potential CDP2 (see FIG. 6) is supplied to the drive electrode TEt, a clearance distance between the adjacent equipotential lines is narrower in the upper region of FIG. 7, i.e., in the region close to the drive electrode TEt than that of the example shown in FIG. 8. That is, the example shown in FIG. 7 can improve the strength of the electric field in the region close to the drive electrode TEt in comparison with the example shown in FIG. 8. Therefore, the example shown in FIG. 7 makes it easy to drive the liquid crystal molecules, which are arranged on the drive electrode TEt side in the Z direction, among the liquid crystal molecules existing in the liquid crystal layer LQ. When the image signal Spic (see FIG. 6) is applied to the pixel electrode PE, the visual-light transmittance (more specifically, the maximum value of the visual-light transmittance) as the entire liquid crystal layer LQ is improved if the liquid crystal molecules on the substrate SUB2 (see FIG. 1) side become easy to drive.

The potential supplied to the drive electrode TEt in the display period FLd is preferably the same potential as the potential CDP1. However, if the potentials CDP1 and CDP2 are different from each other, an effect of making it easy to drive the liquid crystal molecules is obtained in comparison with a case of supplying no potential to the drive electrode TEt. Further, in terms of stabilization of form of the electric field to be generated in the display period FLd, the potential CDP2 as shown in FIG. 6 preferably has a rectangular waveform longer in wavelength than the drive signal DRSt.

Figure 9:
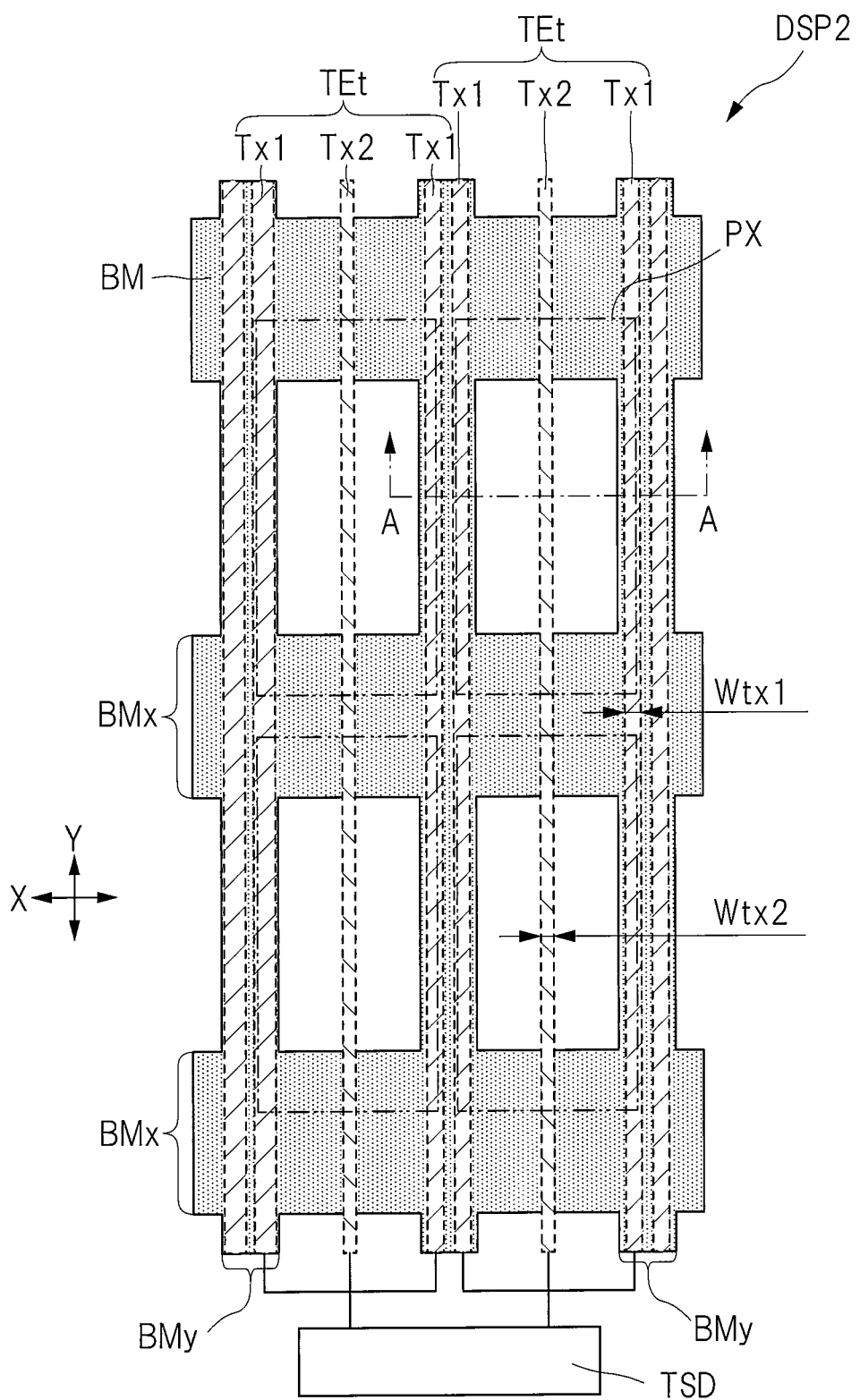
FIG. 9 is an enlarged plan view showing a modification example of a structure of a touch detection drive electrode.
Figure 10:
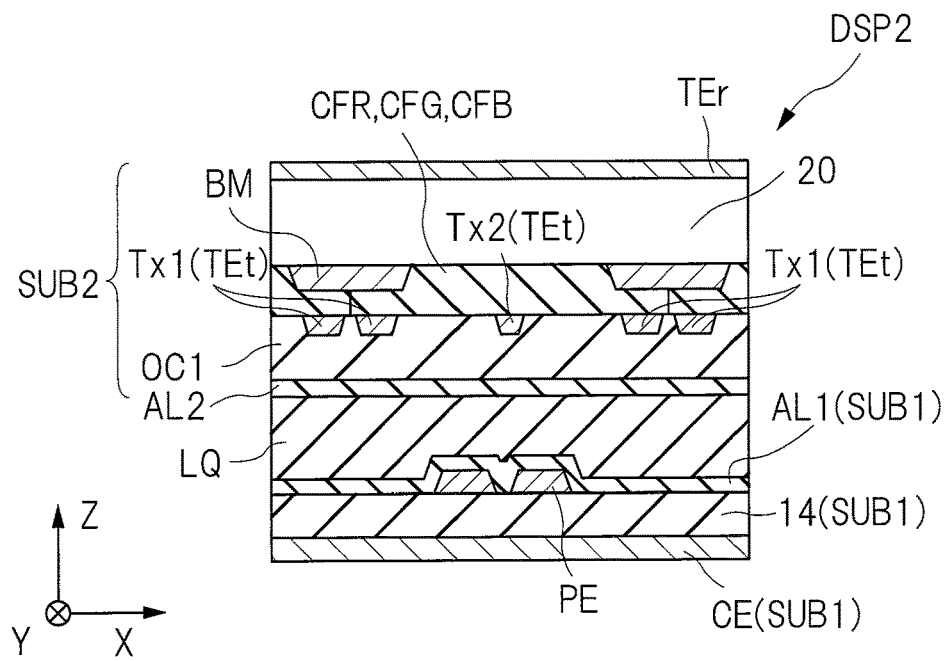
FIG. 10 is an enlarged sectional view taken along line A-A in FIG. 9.
Figure 11:
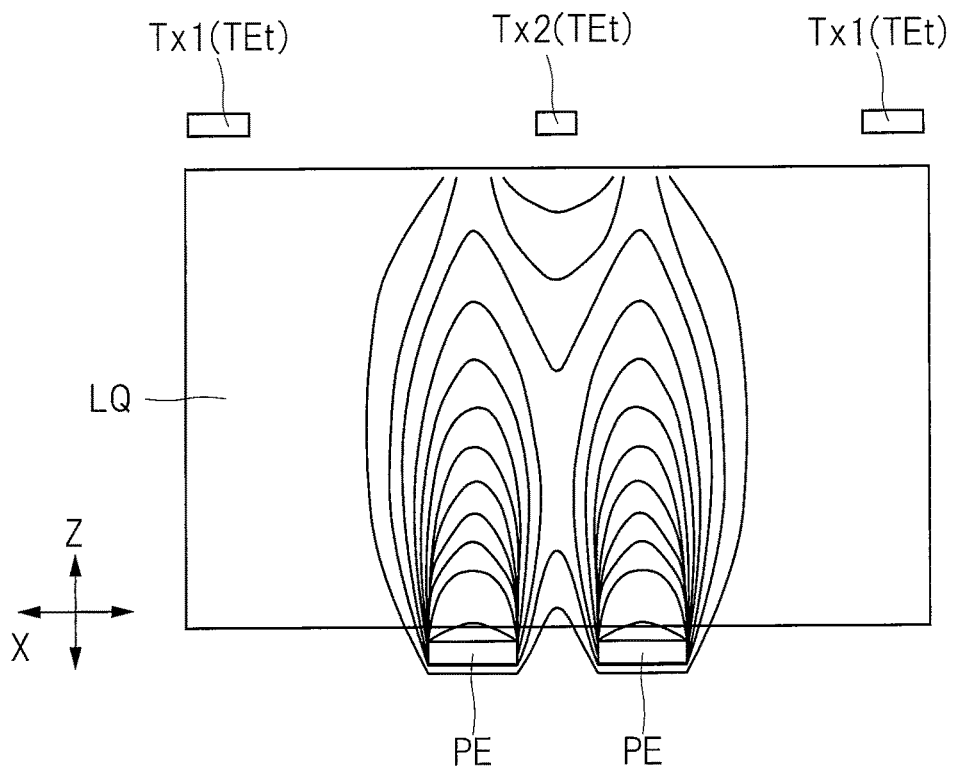
FIG. 11 is a sectional view schematically showing a main part of formation of an electric field generated around the pixel electrode when a potential is supplied to the touch detection drive electrode illustrated in FIGS. 9 and 10 in the display period.
Figure 17:
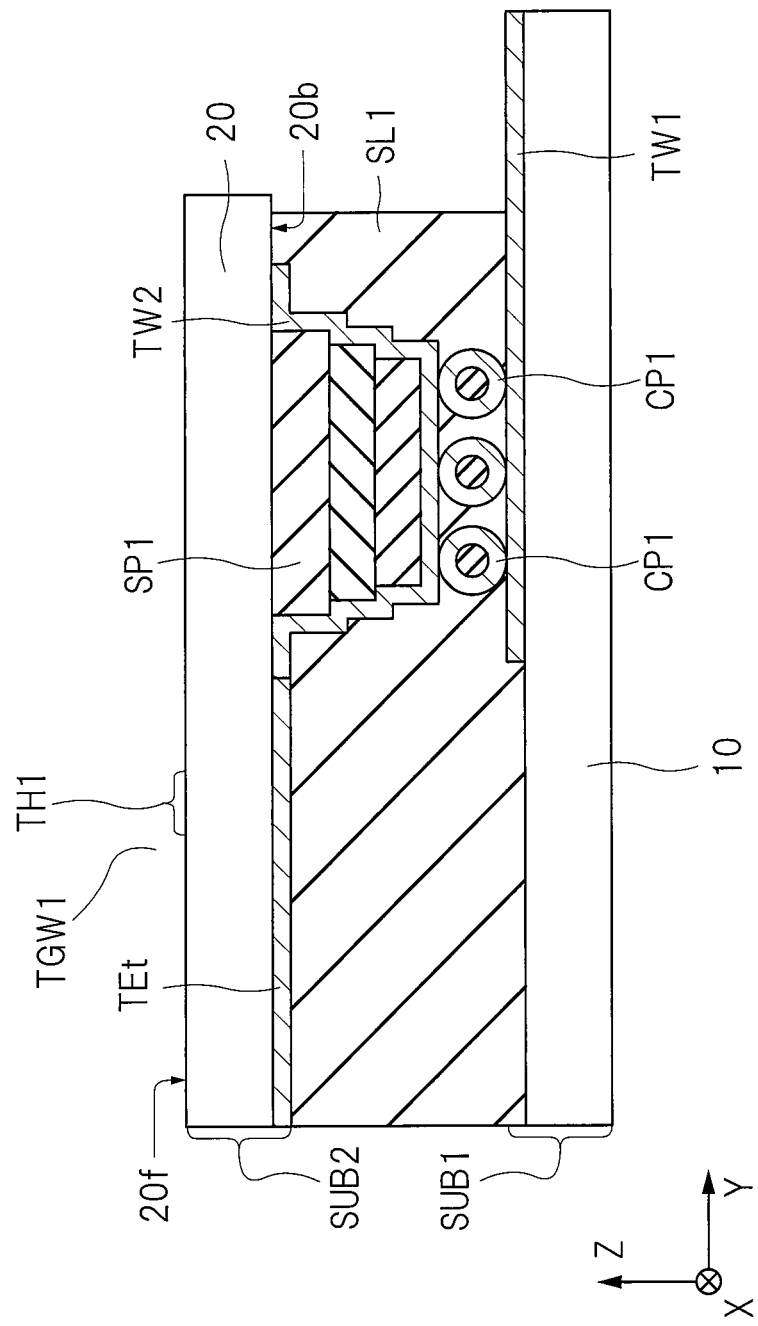
FIG. 17 is an enlarged sectional view showing an example for studying a structure of making conduction between substrates opposing each other.

Additionally, a modification example shown by FIGS. 9 and 10 can be applied as a modification example that further improves a distribution of the strength of the electric field generated around the liquid crystal layer LQ. FIG. 9 is an enlarged plan view showing a modification example of a structure of a touch detection drive electrode. FIG. 9 is a plan view, but the light shielding film BM is dot-patterned, and the drive electrode TEt is hatched. FIG. 10 is an enlarged sectional view taken along line A-A in FIG. 9. FIG. 11 is a sectional view schematically showing a main part of formation of an electric field generated around the pixel electrode when a potential is supplied to the touch detection drive electrode illustrated in FIGS. 9 and 10 in the display period. Further, FIG. 17 is an enlarged sectional view showing an example for studying a structure of making conduction between substrates opposing each other. Incidentally, the display device DSP2 shown in FIGS. 9 and 10 is the same as the display device DSP1 shown in FIG. 1 except for a difference as described below, so that its duplicate description will be omitted.

The display device DSP2 shown in FIG. 9 is different from the display device DSP1 shown in FIG. 1 in a structure of the drive electrode TEt. More specifically, each of the drive electrodes TEt that the display device DSP2 has includes a plurality of portions each extending in the Y direction. Firstly, the drive electrode TEt has a plurality of portions Tx1 overlapping the light shielding film BM and extending along the Y direction. The drive electrode TEt has portions Tx2 each of which is arranged between the plural portions Tx1 and extends along the Y direction. The portion Tx1 extents along an X-direction extending portion of the light shielding film BM. For this reason, the portion Tx1 is made of a transparent conductive material such ITO or IZO, or a metal material. Meanwhile, the portion Tx2 has a region overlapping an X-direction extending portion of the light shielding film BM, and a region not overlapping the light shielding film BM. For this reason, the portion Tx2 in the present embodiment contains the above-described transparent conductive material.

As shown by FIG. 9, the portions Tx1 and Tx2 extend in a long-side direction of the display device DSP2, and are arranged in a short-side direction. When used as auxiliary electrodes for electric field generation, the portions Tx1 and Tx2 need many in number. Further, those portions Tx1 and Tx2 are formed on the substrate 20, but need to be connected to the flexible wiring board FWB1 of the substrate 10 or to be connected to the flexible wiring board FWB2 via a conduction structure like a penetration electrode TGW1 shown in FIG. 14.

Figure 14:
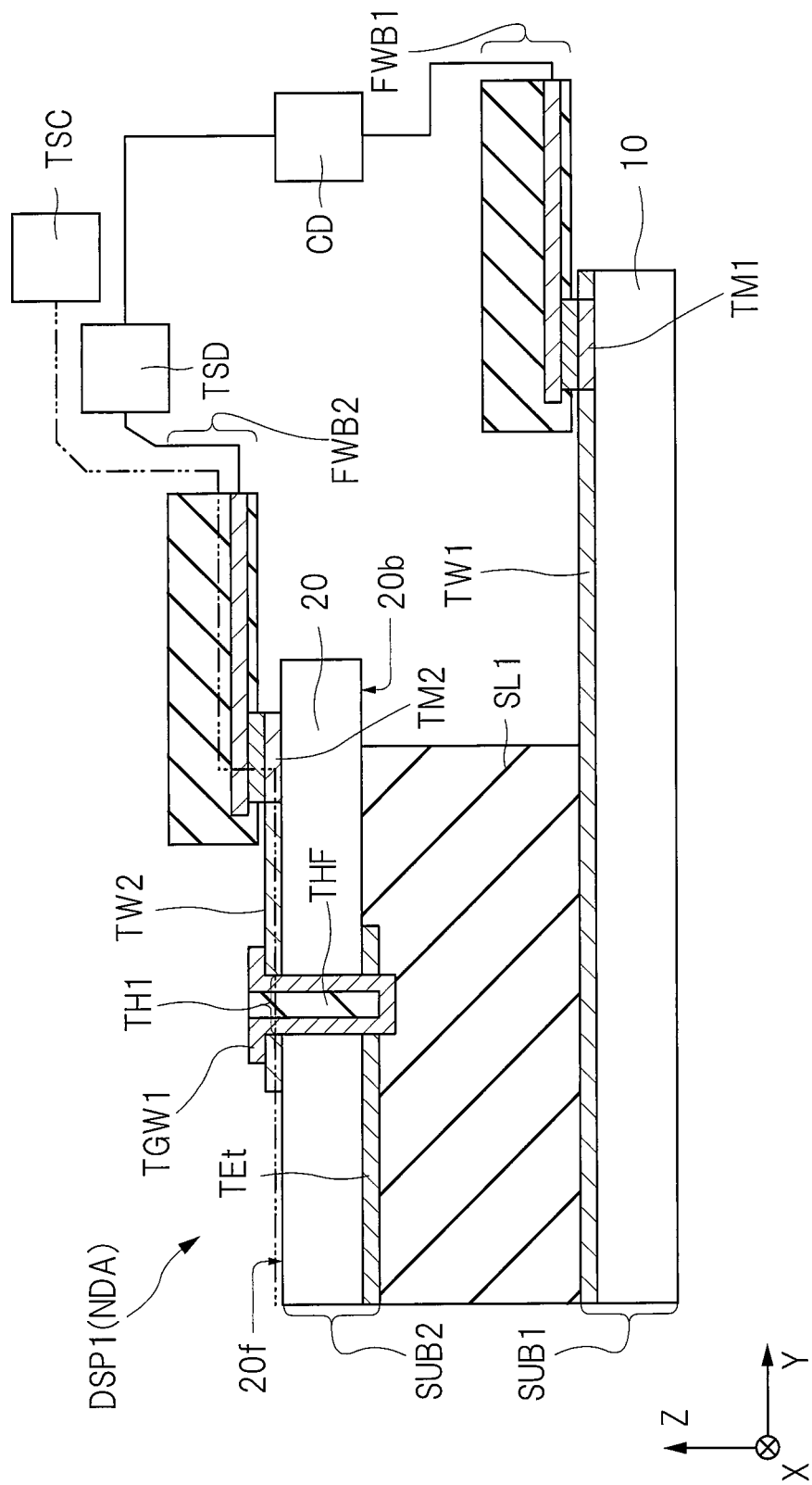
FIG. 14 is an enlarged sectional view showing an example of a wiring path that electrically connects two substrates shown in FIG. 1 and flexible wiring substrates.

A conduction structure as shown by FIG. 17 is used in a method for electrically connecting the substrates 10 and 20. The conduction structure shown in FIG. 17 has a wiring TW2 connected to the drive electrode TEt, and a wiring TW1 formed on the substrate 10, the wirings TW1 and TW2 being electrically connected to each other via the a plurality of conductive particles CP1. A plurality of spacer members SP1 are stacked on the surface 20b of the substrate 20, and the wiring TW2 is formed so as to contact the plural spacer members SP1. Regarding each of a number of wiring paths, if the wiring TW1 of the substrate 10 and the wiring TW2 of the substrate 2 are electrically connected to each other, the conduction structure as shown in, for example, FIG. 17 needs to be provided per a wiring path. The conduction structure for electrically connecting the substrates 10 and 20 like the example shown in FIG. 17 becomes complicated, so that the number of wiring paths for electrically connecting the substrates 10 and 20 is preferably few. Additionally, as shown in FIG. 14, the drive electrode TEt formed on the surface 20b side of the substrate 20 and the wiring TW2 formed on the surface 20f side are electrically connected to each other via the penetration electrode TGW1. Therefore, the number of penetration electrodes TGW1 can be reduced by decreasing the number of wiring paths for electrically connecting the substrates 10 and 20. Since the portions Tx1 and Tx2 are arranged in the short-side direction in the present embodiment, the number of wiring paths for electrically connecting the substrates 10 and 20 can be reduced.

Additionally, in a case of the display device DSP2 as shown in FIG. 9, the plural portions Tx1 and the portion Tx2 of each drive electrode TEt are bundled (i.e., linked to each other). In this case, bundled sections (i.e., sections each linking the plural portions TX1 and the portion Tx2 to each other) shown in FIG. 9, each of which bundles the plural portions Tx1 and the portion Tx2 of each drive electrode TEt, are provided on the liquid crystal layer SL1 side of the substrate 20, that is, preferably provided on the surface 20b side shown in FIGS. 14 and 17. This makes it possible to reduce the number of complicated conduction structures.

In the case of the display device DSP2 shown in FIGS. 9 and 10, the potential CDP2 is supplied to each of the portions Tx1 and Tx2 in the display period FLd shown in FIG. 6. In this case, as shown in FIG. 11, equipotential lines are generated so as to surround a circumference of the portion Tx2. Since the potential CDP2 is applied to this portion Tx2, a clearance distance between the adjacent equipotential lines in a region close to the drive electrode TEt is made narrower than that of the example shown in FIG. 7. Namely, the example shown in FIG. 11 can improve the strength of the electric field in the region close to the drive electrode TEt in comparison with the example shown in FIG. 7. A relation between the portions Tx1 and Tx2 of the drive electrode TEt shown in FIGS. 9 and 10 may be described as follows. That is, the portion Tx2 is an auxiliary electrode arranged between the mutually adjacent portions Tx1 out of the plural portions (main electrodes) Tx1.

Now, even if a width Wtx2 (see FIG. 9) of the portion Tx2 in the X direction is made large, an effect of improving the strength of the electric field generated around the liquid crystal layer LQ is not very higher in comparison with the portion Tx1. Meanwhile, in view of improvement of the transmittance of visible light passing through the display device DSP2, even if a transparent conductive material is used, an area of a material of an electrode to be arranged in a region not overlapping the light shielding film Bm is preferably small. For this reason, in the example shown in FIG. 9, the width Wtx2 of the portion Tx2 in the X direction is smaller than a width Wtx1 of the portion Tx1 in the X direction.

However, there is, as a modification example of the display device DSP2, a case where the width Wtx2 of the portion Tx2 in the X direction is often equal to or more than the width Wtx1 of the portion Tx1 in the X direction. For example, in order to securely make the light shielding film BM and the portion Tx1 overlap each other, to also make the width Wtx1 small is often considered. In this case, the width Wtx2 of the portion Tx2 may be equal to or more than the width Wtx1 of the portion Tx1.

Additionally, the example shown in FIGS. 9 and 10 shows a structure in which: three electrodes (two portions Tx1 and one portion Tx2) extending in the Y direction are electrically connected to each other; and the same voltage is applied to the three electrodes at the same timing. In this case, in order to control an input of the potential CDP2 (see FIG. 6) to the drive electrode TEt independently for each of the sub-pixels PX arranged along the X direction, the two portions Tx1 needs to be arranged between the portions Tx2 in the adjacent drive electrodes TEt in a plan view. For this reason, in the case of the display device DSP2 as shown in FIG. 9, the two portions Tx1 of the drive electrode TEt overlap the one portion Tx1 light of the light shielding film BM.

However, when each of the plural portions Tx1 and Tx2 of the drive electrode TEt is connected to the detection drive circuit TSD independently from each other, a structure in which the one drive electrode TEt overlaps the one portion Tx1 of the light shielding film BM may be adopted as shown in FIG. 1. Additionally, when the potential CDP2 is concurrently supplied to the plural drive electrodes TEt without controlling the input of the potential CDP2 (see FIG. 6) to the drive electrode TEt independently for each of the sub-pixels PX arranged in the X direction, a structure in which the one drive electrode TEt overlaps the one portion Tx1 of the light shielding film BM may be adopted as shown in FIG. 1.

Additionally, although omitted as illustration, a structure in which the two drive electrodes TEt overlap the one portion Tx1 of the light shielding film BM may be adopted as a modification example with respect to the example shown in FIG. 1. Further, the following modification example will be taken up and described about a structure example in which the two drive electrodes TEt overlap the one portion Tx1 of the light shielding film BM. However, a structure in which the one drive electrode TEt overlaps the one portion Tx1 of the light shielding film BM may be adopted similarly to the example shown in FIG. 1.

<Modification Example of Structure of Electrode>

Figure 12:
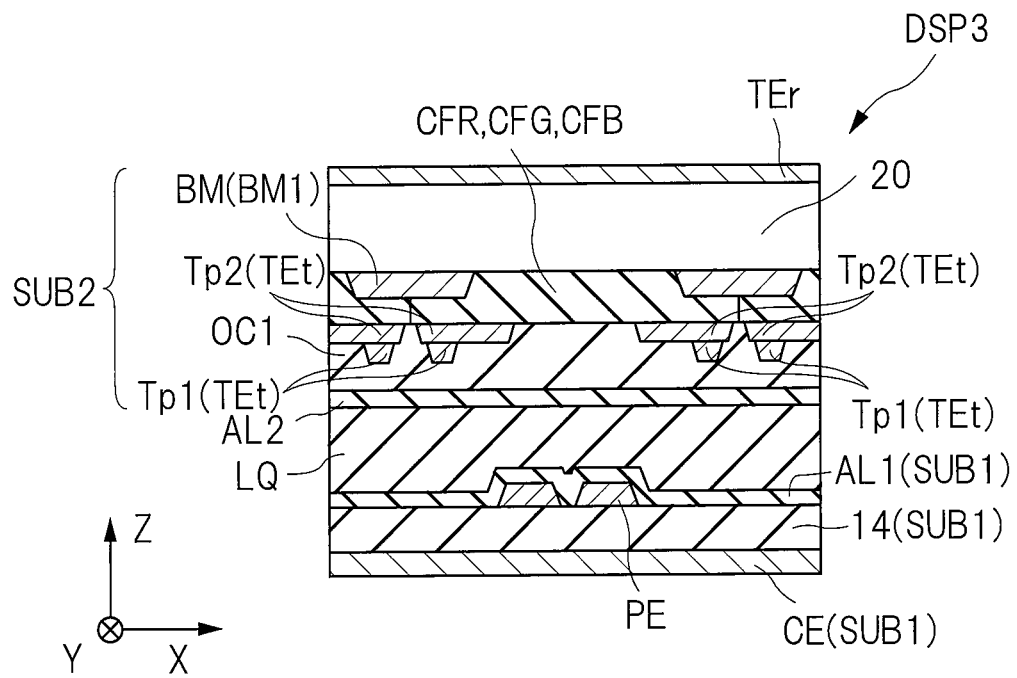
FIG. 12 is an enlarged sectional view showing another modification example of a structure of the touch detection drive electrode.

Next, another modification example about the above-described drive electrode TEt will be described. FIG. 12 is an enlarged sectional view showing another modification example of a structure of the touch detection drive electrode. Incidentally, a display device DSP3 shown in FIG. 12 is almost the same as the display device DSP1 shown in FIG. 1 except for a difference explained below, so that its duplicate explanation will be omitted.

A display device DSP3 shown in FIG. 12 is different from the displace device DSP1 shown in FIG. 1 and the display device DSP2 shown in FIG. 10 in that each of the plural drive electrodes TEt becomes a laminate structure of the conductive patterns Tp1 and Tp2. More specifically, the drive electrode TEt in the display device DSP3 has a conductive pattern Tp1 made of metal, and a conductive pattern Tp2 made of a transparent conductive material. The conductive patterns Tp1 and Tp2 are laminated in order of the conductive patterns Tp2 and TP1 from the substrate 20 side toward the substrate SUB1 side. The conductive pattern Tp1 overlaps the light shielding film BM. The conductive pattern Tp2 has a portion overlapping the conductive pattern Tp1, and a portion not overlapping the conductive pattern Tp1 and the light shielding film BM.

In view of reduction in the impedance of the touch detection drive electrode TEt, the drive electrode TEt is preferably made of metal. Meanwhile, in view of improvement of accuracy for the touch detection, each width of or/and an arrangement pitch between the plural drive electrodes TEx in the X direction is preferably adjusted to an appropriate values. However, if the width of the drive electrode TEt becomes large, part of the drive electrode TEt does not overlap the light shielding film BM as shown in FIG. 12. Particularly, when the width of the light shielding film BM in the X direction is narrow, it is difficult to arrange the drive electrode so that the entirety of the wide drive electrode TEt overlaps the light shielding film BM. For example, the light shielding film BM in the display device DSP3 has the same structure as the light shielding film BM shown in FIG. 4, and so will be described as follows by reference to FIG. 4: an X-directional width WB1 of a portion BMy extending in the Y direction in the light shielding film BM is narrower than a Y-directional width WB2 of a portion BMx extending in the X direction in the light shielding film BM.

In the case of the display device DSP3, since part of the drive electrode TEt is formed of a transparent conductive material, a reduction in the transmittance of visual light can be suppressed even if such a portion formed of the transparent conductive material does not overlap the light shielding film BM. As a result, a degree of freedom of design about each width of and an arrangement pith between the plural drive electrodes TEt in the X direction is improved. Additionally, in the case of display device DSP3, since part of the drive electrode TEt is formed of metal, it is possible to reduce impedance of the drive electrode TEt and improve the electric characteristic.

Figure 13:
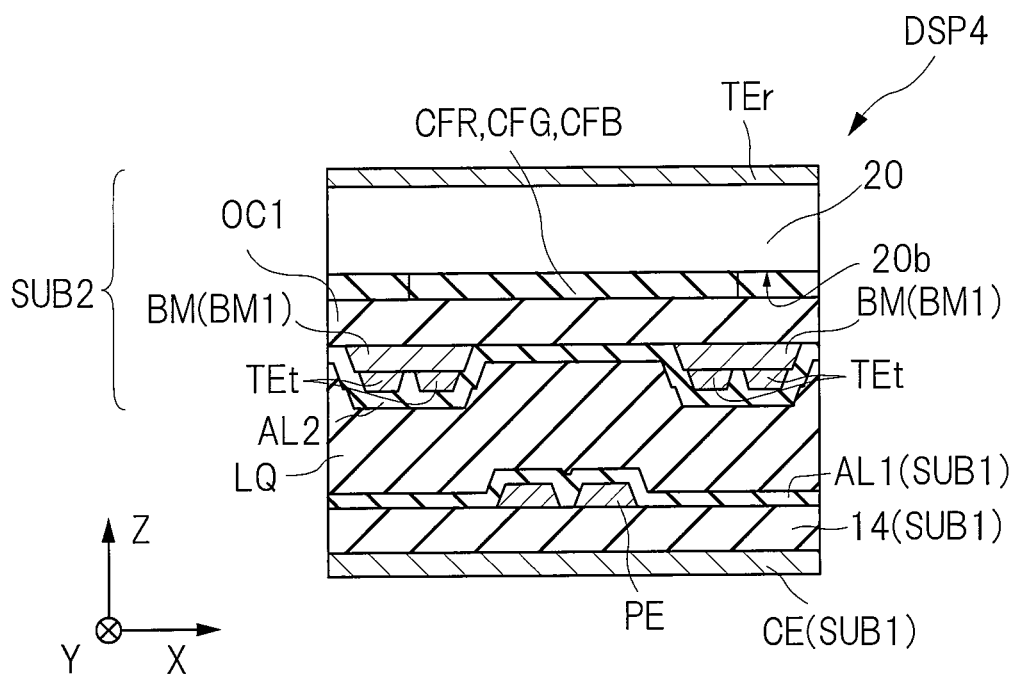
FIG. 13 is an enlarged sectional view showing a modification example of an arrangement of a light shielding film and a structure of a touch detection drive electrode accompanied by the arrangement.

Additionally, FIG. 13 is an enlarged sectional view showing a modification example of an arrangement of a light shielding film and a structure of a touch detection drive electrode accompanied by the arrangement. Incidentally, a display device DSP4 shown in FIG. 13 is almost the same as the display device DSP1 shown in FIG. 1 except for a difference described below, so that its duplicate description will be omitted.

The display device DSP4 shown in FIG. 13 is different from the display device DSP1 shown in FIG. 1 in a position of the light shielding film BM and positions of the drive electrodes TEt in a thickness direction (Z direction) of the substrate SUB2. More specifically, the substrate SUB2 in the display device DSP4 has: a color filter layer (color filters CFR, CFG, and CFB); and an insulating film OC1 that is an organic insulating film covering the color filter layer. The light shielding film BM in the display device DSP4 is between the insulating film OC1 and the substrate SUB1. More specifically, the light shielding film BM exists between the insulating film OC1 and the orientation film AL2.

when the light shielding film BM is not covered with the insulating film OC1 like the display device DSP4, a structure in which each of the plural drive electrodes TEt is provided between the color filter layer and the insulting film OC1 is also considered. However, when the drive electrode TEt is formed between the light shielding film BM and the substrate 20, there is a possibility that an influence of refraction or/and reflection of light due to the drive electrode TEt will bring degradation of image quality evern if the drive electrode TEt and the light shielding film BM overlap each other.

Therefore, in view of suppression of an optical influence on the drive electrode TEt, the drive electrode TEt is preferably provided between the light shielding film BM and the substrate SUB1 Additionally, a distance between the light shielding film BM and the drive electrode TEt is preferably short, particularly the light shielding film BM and the drive electrode TEt more preferably adhere tightly to each other as shown in FIG. 13.

<Connection of Touch Detection Electrode and Circuit>

Next, described will be a configuration example of wiring paths for electrically connecting the touch detection electrode (drive electrode TEt and detection electrode TEr) explained with reference to FIG. 5 and a touch detection circuit (detection drive circuit TSD and detection circuit TSC). FIG. 14 is an enlarged sectional view showing an example of a wiring path that electrically connects two substrates shown in FIG. 1 and flexible wiring substrates. A portion shown by FIG. 14 is an enlarged sectional view of a portion of the frame region NDA in the display device DSP1. FIG. 14 shows, by a solid line, the wiring path to be connected to the detection drive circuit TSD among the plural wiring paths shown in FIG. 5. The wiring path to be connected to the detection circuit TSC among the plural wiring paths shown in FIG. 5 are on a cross-section surface different from a cross-section surface provided with the wiring path to be connected to the detection drive circuit TSD, but this is shown by a dash-double-dot line in FIG. 14.

In the case of display device DSP1 as shown in FIG. 5, the wiring board FWB2 is connected to the substrate SUB2, and the wiring board FWB2 is provided with the detection drive circuit TSD and the detection circuit TSC. As shown in FIG. 14, each of the touch detection electrodes (drive electrode TEt and detection electrode TEr) are electrically connected to the wiring board FWB2 via the wiring TW2 and a terminal TM2 that are formed on the surface 20f of the substrate 20. FIG. 14 shows an example of wiring paths to be connected to the drive electrode TEt. The drive electrode TEt is formed on the surface 20b of the substrate 20, and so is connected to the wiring TW2 via a penetrate electrode (penetrate wiring) TGW1 that is embedded in a through hole TH1 penetrating from one of the surfaces 20f and 20b of the substrate 20 to the other. Additionally, the drive electrode TEt is covered with a sealing material SL1 in the frame region NDA.

Meanwhile, the wiring board FWB1 is connected to the substrate SUB1. The common electrode CE (see FIG. 2) and the scanning line drive circuit GD (see FIG. 2) provided on the substrate SUB1 are electrically connected to the wiring board FWB1 via the wiring TW1 and the terminal TM1 provided on the substrate SUB1.

In the case of the display device DSP1, the wiring board FWB1 is attached to the substrate SUB1, and the wiring board FWB2 is attached to the substrate SUB2. The wiring board FWB1 is provided with a circuit for mainly controlling the display unit, and the wiring board FWB2 is provided with a circuit for mainly controlling the input unit. Additionally, as schematically shown in FIG. 14, a common electrode drive circuit CD provided on the wiring board FWB1 and a detection drive circuit TSD provided on the wiring board FWB2 are electrically connected to each other, and the potential CDP2 can be applied to the drive electrode TEt in the display period FLd shown in FIG. 6. When the plural wiring boards FWB1 and FWB2 are connected like the display device DSP1, each layout of the wirings TW1 and TW2 is easy to simplify. Incidentally, a plurality of common electrode drive circuits CD may be arranged for the wiring boards FWB1 and FWB2.

However, in view of reduction in the number of parts of the display device, it is preferable to bring together the wiring boards FWB1 shown in FIG. 2 and the board FWB2 shown in FIG. 5. The inventor in the present application has studied an aspect of bringing together the wiring board FWB1, and the wiring board FWB2 shown in FIG. 5. When the plural detection electrodes TEr (see FIG. 5) extend along the X direction, it has been understood to able to suppress an increase in the frame region NDA due to bringing together the wiring boards FWB1 and FWB2. Hereinafter, a modification example will be described.

Figure 15:
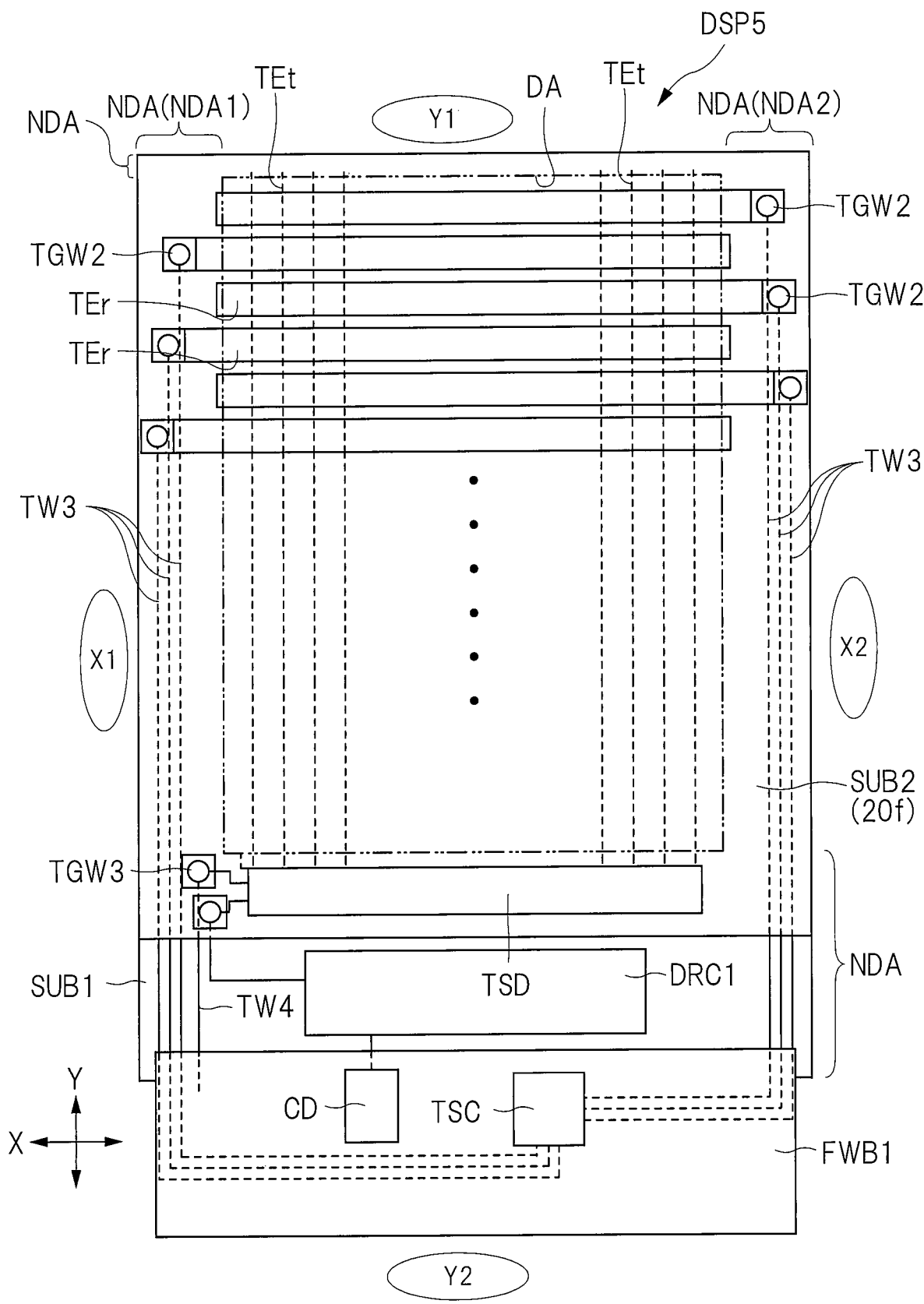
FIG. 15 is a plan view showing an example of a wiring layout of a detection electrode in a display device that is a modification example with respect to FIG. 5.
Figure 16:
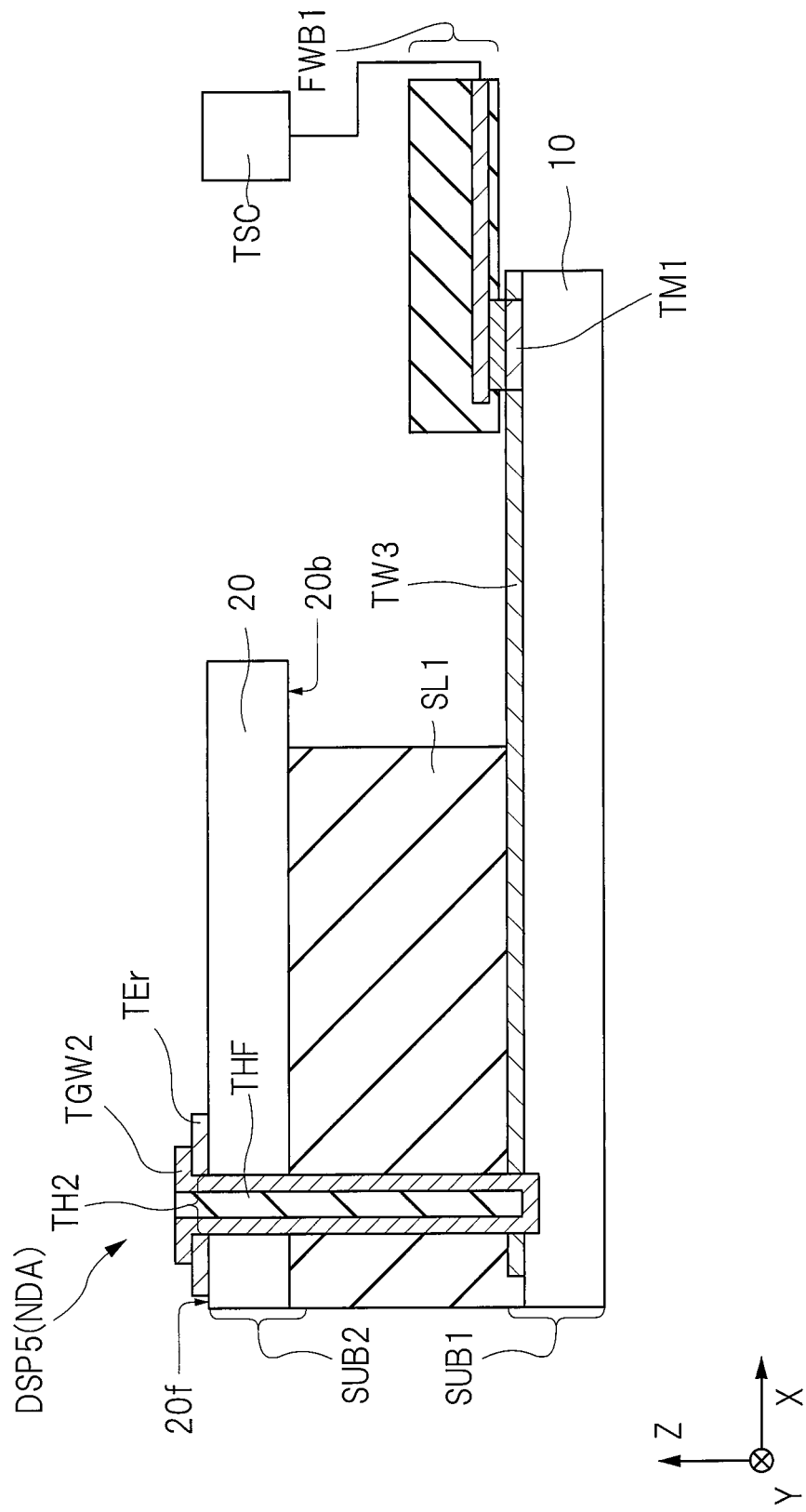
FIG. 16 is an enlarged sectional view taken along a wiring path leading to a wiring substrate from the detection electrode shown in FIG. 15.

FIG. 15 is a plan view showing an example of a wiring layout of a detection electrode in a display device that is a modification example with respect to FIG. 5. FIG. 16 is an enlarged sectional view taken along a wiring path leading to a wiring substrate from the detection electrode shown in FIG. 15. Incidentally, a display device DSP5 shown in FIGS. 15 and 16 is almost the same as the display device DSP1 shown in FIG. 1 except for a difference described below, so that its duplicate explanation will be omitted.

A display device DSP5 shown in FIGS. 15 and 16 is different from the display device DSP1 shown in FIG. 14 in that the detection circuit TSC for touch detection is provided on the wiring board FWB1 and the wiring board FWB2 (see FIG. 14) is not connected to the substrate SUB2. A detection circuit TSC in the display device DSP5 is connected to the detection electrode TEr via the plural wirings TE3 and the penetration electrodes (penetration wirings) TGW2, the detection electrode TEr being provided on the substrate SUB2, the plural wiring TW3, and the penetration electrodes TGW2 being provided on the substrate SUB1.

A through hole TH2 formed in the penetration electrode TGW2 passes through one of the surfaces 20f and 20b of the substrate 20 to the other. The through hole TH2 is different from the through hole TH1 shown in FIG. 14 in that the through hole TH2 passes through the sealing material SL1 and the wiring TW3 on the substrate SUB1 Each of the penetration electrodes TGW2 is a conductive pattern formed so as to cover a sidewall and a bottom surface of the through hole TH2. A part of each of the penetration electrodes TGW2 contacts the detection electrode TEr, and the other part thereof contacts the wiring TW3. Namely, the penetration electrode TGW2 is an inter-substrate conductive path (via wiring) for electrically connecting the detection electrode TEr and the wiring TW3 to each other. A filler THF is put inside the penetration electrode TGW2 in the through hole TH2. Used as the filler THF is, for example a resin material. The filler THF may be an insulating material or a conductive material. Incidentally, the filler THF is put also inside the penetration electrode TGW1 in the through hole TH1 as shown in FIG. 14.

The substrate SUB2, on which the detection electrode TEr is preliminarily formed, is laminated with the substrate SUB1 via the sealing material SL1, and thereafter the through hole TH2 is formed by irradiating a laser beam(s) from the substrate SUB2 side.

Like the display device DSP5, when each of the plural detection electrodes TEr is connected to the wiring TW3 that is formed on the substrate SUB1 via the penetration electrode TGW2, the wiring board FWB2 shown in FIG. 14 may be not provided, so that the number of components can be reduced in comparison with those of the display device DSP1 shown in FIG. 14.

Now, when each of the plural detection electrodes TEr is connected to the penetration electrode TGW2, a space for arranging a lot of penetration electrodes TGW2 into the frame region NDA on the substrate SUB2 in a plan view is necessary. The penetration electrode TGW2 reaches the substrate SUB1, so that it is difficult to put wirings such as the signal connection wirings SCL shown in FIG. 2 in a region overlapping the penetration electrode TGW2 in the substrate SUB1. For this reason, an area of the frame region NDA increases by providing the penetration electrode TGW2 and, in order to suppress such an increase, the penetration electrode TGW2 is preferably provided in a region having a relatively low wiring density.

As shown in FIG. 2, the driver chip DRC1 is arranged between the display region DA and the wiring board FWB1, and a number of signal connection wirings SCL (see FIG. 2) is put at high densities in a region between the driver chip DRC1 and the display region DA. Although illustration of the signal connection wirings SCL shown in FIG. 2 is omitted in FIG. 5 for making it easy to see, a number of signal connection wirings SCL also in a case of the display device DSP5 are arranged at high densities. Therefore, it is difficult to arrange the penetration electrodes TGW2 in the region between the driver chip DRC1 and the display region DA. In other words, a number of penetration electrodes TGW2 are preferably arranged by avoiding the region between the driver chip DRC1 and the display region DA.

Each of the plural penetration electrodes TGW2 that the display device DSP5 shown in FIG. 5 has is arranged in the frame region (non-display region) adjacent to the display region DA in the X direction. More specifically, the substrate SUB2 has: the display region DA; the frame region (non-display region) NDA1 existing on an X1 side of the display region DA in the X direction; and the frame region (non-display region) NDA2 existing on an X2 side of the display region DA in the X direction. In an example shown in FIG. 15, the plural penetration electrodes TGW2 are respectively arranged in both of the frame regions NDA1 and NDA2. Thus, since the both of frame regions NDA1 and NDA2 are utilized as the arrangement space of the penetration electrodes TGW2, an increase in an area of the entire frame region NDA can be suppressed.

Additionally, each of the plural detection electrodes TEr in the display device DSP5 extends along the X direction. This is preferable in that a connection distance between the detection electrode TEr and the penetration electrode TGW2 can be shortened. For example, studied as an example corresponding to the display device DSP5 is a case where the plural drive electrodes TEt extend along the X direction and each of the plural detection electrodes TEr extends in the Y direction. When each of the detection electrodes TEr extends along the Y direction, a path distance (connection distance) of a draw wiring to be connected to each of the penetration electrodes TGW2 arranged in the frame region NDA1 or NDA2 is long. If the connection distance of the detection electrode TEr and the penetration electrode TGW2 is long, a transmission loss of a detection signal becomes great in a path from the detection electrode TEr to the detection circuit TSC. Additionally, as the number of draw wirings becomes large, an arrangement space of the draw wirings increases, and an area of the entire frame region NDA increases consequently.

In the case of the display device DSP 5 as shown in FIG. 15, the detection electrodes TEr extend along the X direction in a plan view, so that the penetration electrode TGW2 is arranged on an extension line of the detection electrode TEr. For this reason, the connection distance between the detection electrode TEr and the penetration electrode TGW2 can be shortened. Therefore, since the substrate SUB2 needs to provide no draw wiring therein, the increase in the area of the frame region NDA can be suppressed.

Additionally, the wiring TW3 to be connected to the penetration electrode TGW2 has a portion extending along the Y direction. A portion of the wiring TW3 arranged in the frame region NDA is formed on, for example, the wiring layer WL2 or WL3 out of the plural wiring layers shown in FIG. 1. Each of the plural wirings TW3 in the example shown in FIG. 15 extends linearly along the Y direction.

Thus, the path distance from the detection electrode TEr to the detection circuit TSC becomes slightly longer than that in the case of the display device DSP1 shown in FIG. 5. Incidentally, strictly speaking, since the penetration electrode TGW2 is inserted, the display device DSP5 is longer than the display device DSP1.

Additionally, as shown in FIG. 15, the plural drive electrodes TEt in the display device DSP5 extend along the Y direction. In this case, a path for suppling the touch detection drive signal (see FIG. 6) to the drive electrode TEt becomes necessary. In the example shown in FIG. 15, the detection drive circuit TSD is formed on the substrate SUB2. The detection drive circuit TSD includes: a shift register circuit for generating the drive signal DRSt; a switching circuit for selecting the drive electrode TEt supplied with the drive signal DRSt or potential CDP2 (see FIG. 6) among the plural drive electrodes TEt; or the like. In this case, the number of wiring paths for electrically connected to the detection drive circuit TSD and the wiring TW4 formed on the substrate SUB1 may be few. In the example shown in FIG. 15, the wiring TW4 and the detection drive circuit TSD that are formed on the substrate SUB1 are electrically connected to each other via the penetration electrode TGW3. A connection structure of the penetration electrode TGW3 and the wiring TW4 is almost the same as the connection structure of the penetration electrode TGW2 and the wiring TW3 shown in FIG. 16, so that its illustration in the drawings will be omitted. In the case of the display device DSP5, since the detection drive circuit TSD is formed on the substrate SUB2, the number of penetration electrodes TGW3 may be small. Therefore, the penetration electrodes TGW3 can be arranged by avoiding the wirings such as the signal connection wiring SCL etc. shown in FIG. 2.

Incidentally, if the above switching circuit for selecting the drive electrode TEt in the detection drive circuit TSD shown in FIG. 15 is formed on the substrate SUB2, the number of penetration electrodes can be reduced. Therefore, the above-describe shift register circuit etc. may be formed on the substrate SUB1 or the wiring board FWB1. The detection drive circuit TSD in the case shown in FIG. 15 is also formed on the surface 20f side of the substrate SUB2. However, the detection drive circuit TSD may be formed on the surface 20b of the substrate 20 shown in FIG. 1.

As described above, each of the plural drive electrodes TEt in the case of the display device DSP5 extends along the Y direction, and each of the plural detection electrodes TEr extends along the X direction. Each of the plural penetration electrodes TGW2 is arranged in the frame region NDA1 or NDA2. The detection electrode TEr is also connected to the detection circuit TSC via the penetration electrode TGW and the wiring TW3. For this reason, even when the detection circuit TSC is arranged on the wiring board FWB1, the increase in the path distance from the detection electrode TEr to the detection circuit TSC can be suppressed. As a result, reduced can be the transmission loss of the detection signal on the path from the detection electrode TEr to the detection circuit TSC.

In the foregoing, the invention made by the inventor of the present invention has been concretely described based on the embodiments. However, various modifications and alterations can be made.

For example, a technique described in the above embodiment can be widely applied to a display device having a mechanism in which a signal(s) from a circumference of the display device is supplied to a plurality of elements in a display region provided with an electrooptical layer. The electrooptical layer is a layer equipped with an element that is driven by an electrical control signal(s) and has a function for forming a display image(s). Exemplified as the above-described display device can be, for example, various display devices such as the liquid crystal display device explained in the above embodiment, an electro-luminescence display device, and a plasma display device.

Additionally, for example, described in the above-described embodiment has been, as the touch detection method, a mutual capacitance method of detecting a signal(s) based on an electrostatic capacitance between two electrodes oppositely arranged in a state of separating from each other. Applied as a modification example with respect to the above-described embodiment may be a self-capacitance method of detecting a signal(s) based on variation of an electrostatic capacitance between one electrode and a reference potential such as a grounding potential. In this case, the plural detection electrodes TEr shown in FIG. 5 are not formed, and the plural drive electrodes TEt shares a function as the detection electrode TEr. In the self-capacitance method, a portion supplied with the reference potential is a conductive pattern arranged at the circumference of the electrode and at such a separation distance as to be able to form an electrostatic capacitance detectable between the electrode and the portion, and its shape etc. are not particularly limited thereto if a supply path of a fixed potential is connected. For example, in a case of applying the self-capacitance method, a conductive layer as an electromagnetic shield layer may be formed on the surface $20f$ of the substrate 20 instead of the detection electrode TEr shown in FIG. 1. In this case, the reference potential may be supplied to the conductive layer.

Further, for example, described as the modification example with respect to the display device DSP1 shown in FIG. 1 have been various modification examples in the above-mentioned embodiment. However, some of the above-described modification examples can be also applied by a combination with one and the other thereof.

A person having an ordinary skill in the art can make various modification examples and correction examples within a scope of the idea of the present invention, and it is interpreted that the modification examples and the correction examples also belong to the scope of the present invention. For example, the examples obtained by performing addition or elimination of components or design change or the examples obtained by performing addition or reduction of process or condition change to the embodiment described above by a person having an ordinary skill in the art are also included in the scope of the present invention as long as they include the gist of the present invention.

The present invention is utilizable to a display device or an electronic device in which the display device is incorporated.

What is claimed is:

1. A display device comprising:
a first substrate;
a second substrate;
a pixel electrode on the first substrate;
a common electrode on the first substrate;
a first signal line existing on the first substrate and extending in a first direction;
a light shielding film including a plurality of first light shielding portions extending in the first direction, and a plurality of second light shielding portions extending in a second direction intersecting with the first direction;
a first electrode existing on the second substrate and extending in the first direction; and
a second electrode existing over the first electrode, extending in the second direction and electrically connected to a detection circuit,
wherein the first electrode includes:
a plurality of first portions overlapping any of the plurality of first light shielding portions and extending the first direction, and
a second portion arranged between the first portions and extending the second direction;
the second portion includes:
a plurality of first regions not overlapping the light shielding film,
a plurality of second regions overlapping any of the plurality of second light shielding portions;
in the first direction, the plurality of first regions and the plurality of second regions are alternately arranged,
the plurality of first portions and the second portion of the first electrode intersects with the second electrode,
each of the plurality of first portions of the first electrode overlaps the first signal line,
a period in which the display device operates includes a display period for forming a display image, and a detection period for detecting an input,
in the display period, the same potential is supplied to each of the first electrode and the common electrode, and
in the detecting period, a potential different from that in the display period is supplied to the first electrode.

2. The display device according to claim 1, wherein a material of the plurality of first portions of the first electrode is metal, and a material of the second electrode is a transparent conductive material.

3. The display device according to claim 2, wherein the second substrate comprises:
a color filter layer;
an organic insulating film covering the color filter layer; and
the light shielding film existing between the organic insulating film and the first substrate and extending in the first and second directions, and
the first electrode is between the light shielding film and the first substrate.

4. The display device according to claim 1, wherein a width of each of the plurality of first light shielding portions is narrower than that of each of the plurality of second light shielding portions, and
the plurality of first portions includes a first conductive pattern and a second conductive pattern, the first conductive pattern containing a metal material, and the second conductive pattern including a portion that overlaps the first conductive pattern and containing a transparent conductive material.

5. The display device according to claim 4, wherein the second substrate comprises:
a color filter layer;
an organic insulating film covering the color filter layer; and
the light shielding film existing between the organic insulating film and the first substrate and extending in the first and second directions, and
the first electrode is between the light shielding film and the first substrate.

6. The display device according to claim 1, wherein the second portion of the first electrode contains a transparent conductive material.

7. The display device according to claim 6, wherein a width of the second electrode is narrower than a first-direction width of one out of the first portions.

8. The display device according to claim 7, wherein the second substrate comprises:
a color filter layer;
an organic insulating film covering the color filter layer; and the light shielding film existing between the organic insulating film and the first substrate and extending in the first and second directions, and the first electrode is between the light shielding film and the first substrate.

9. The display device according to claim 6, wherein the second substrate comprises:
   a color filter layer;
   an organic insulating film covering the color filter layer; and
   the light shielding film existing between the organic insulating film and the first substrate and extending in the first and second directions, and
   the first electrode is between the light shielding film and the first substrate.

10. The display device according to claim 1, wherein the second substrate comprises:
    a color filter layer;
    an organic insulating film covering the color filter layer; and
    a light shielding film existing between the organic insulating film and the first substrate and extending in the first and second directions, and
    the first electrode is between the light shielding film and the first substrate.

11. The display device according to claim 1, further comprising:
    a base substrate existing on the second substrate and made of an insulating material;
    a first wiring having a portion, the portion extending along the first direction; and
    a penetration electrode passing through the base substrate on the second substrate,
    wherein the second substrate has the second electrode on a surface opposite to a surface opposing the first substrate,
    the penetration electrode electrically connects the second electrode and the first wiring, and
    the second electrode is electrically connected to the detection circuit via the penetration electrode and the first wiring.

12. The display device according to claim 11, further comprising:
    a plurality of penetration electrodes composed of the penetration electrode, the plural penetration electrodes penetrating the base substrate on the second substrate,
    wherein the second substrate includes a display region, a first non-display region existing on a first side of the display region in the second direction, and a second non-display region existing on a second side of the display region in the second direction, and
    the plural penetration electrodes are in the first and second non-display regions.

* * * * *